(12) United States Patent
Nazarathy et al.

(10) Patent No.: US 9,059,889 B2
(45) Date of Patent: Jun. 16, 2015

(54) POLAR MULTI-SYMBOL DELAY DETECTOR FOR CARRIER PHASE AND FREQUENCY RECOVERY FOR COHERENT TRANSMISSION

(71) Applicant: Technion Research and Development Foundation LTD., Haifa (IL)

(72) Inventors: Moshe Nazarathy, Haifa (IL); Igor Tselniker, Haifa (IL); Alex Tolmachev, Karmiel (IL)

(73) Assignee: TECHNION RESEARCH AND DEVELOPMENT FOUNDATION LTD., Haifa (IL)

( * ) Notice: Subject to any disclaimer, the term of this patent is extended or adjusted under 35 U.S.C. 154(b) by 0 days.

(21) Appl. No.: 14/203,593

(22) Filed: Mar. 11, 2014

(65) Prior Publication Data

US 2014/0254723 A1    Sep. 11, 2014

Related U.S. Application Data

(60) Provisional application No. 61/775,709, filed on Mar. 11, 2013.

(51) Int. Cl.
| | |
|---|---|
| *H04L 27/00* | (2006.01) |
| *H04L 27/38* | (2006.01) |
| *H04L 27/227* | (2006.01) |
| *H04L 27/20* | (2006.01) |
| *H04B 10/61* | (2013.01) |
| *H04B 10/67* | (2013.01) |

(52) U.S. Cl.
CPC ......... *H04L 27/3872* (2013.01); *H04L 2203/00* (2013.01); *H04L 27/227* (2013.01); *H04L 27/2071* (2013.01); *H04B 10/61* (2013.01); *H04B 10/6165* (2013.01); *H04B 10/611* (2013.01); *H04B 10/677* (2013.01); *H04L 27/38* (2013.01)

(58) Field of Classification Search
CPC .............. H04L 27/227; H04L 27/3872; H04L 27/2071; H04L 2203/00; H04L 27/38; H04B 10/677; H04B 10/61; H04B 10/611; H04B 10/6165
USPC ................................. 375/326, 325
See application file for complete search history.

(56) References Cited

U.S. PATENT DOCUMENTS 5,740,204 A * 4/1998 Nagashima ................... 375/341
6,674,814 B2 * 1/2004 Tanada .......................... 375/326

* cited by examiner

*Primary Examiner* — Rahel Guarino
(74) *Attorney, Agent, or Firm* — Reches Patents

(57) ABSTRACT

A method for calculating a reconstructed phase that includes: Calculating a current phase signal and current amplitude signal that represent a phase and amplitude of a current input symbol, respectively. Generating, in response to the current phase signal and an estimate of a phase of a last input symbol that preceded the current input symbol, multiple partial references, some of which are responsive to (i) phase signals representative of phases of a plurality of input symbols that preceded the current input symbol, and (ii) estimates of the phase of the plurality of input symbols. Calculating unwrapped partial references. Estimating a constant carrier frequency offset (CFO) phase rotation in response to the unwrapped partial references. Calculating a reconstructed phase of the current input symbol in response to, at least, the estimate of the constant CFO phase rotation and to the unwrapped partial references.

20 Claims, 21 Drawing Sheets

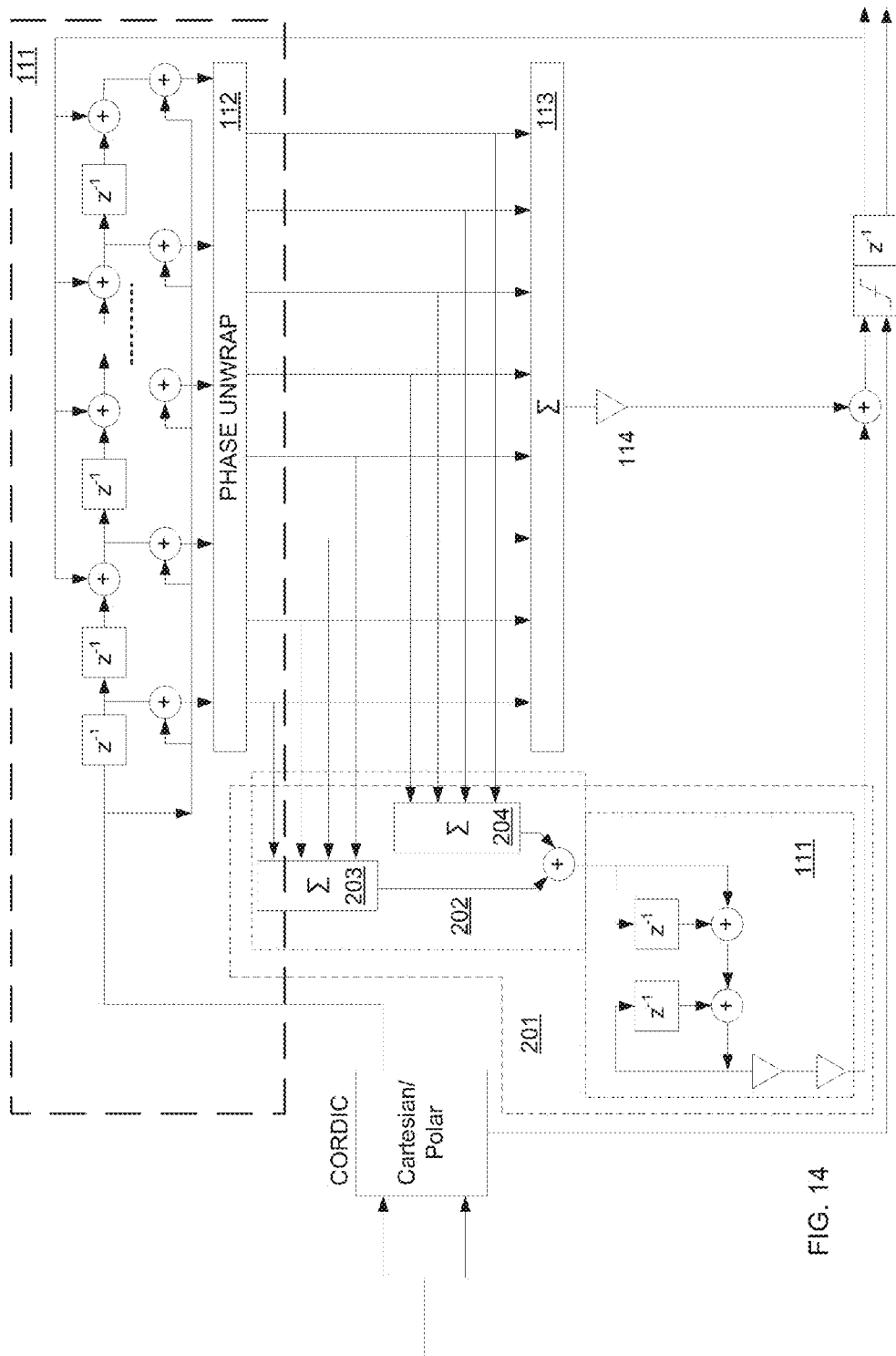

POLAR MULTI-SYMBOL DELAY DETECTOR FOR CARRIER PHASE AND FREQUENCY RECOVERY FOR COHERENT TRANSMISSION

RELATED APPLICATIONS

This application claims the benefit of US provisional patent filing date Mar. 11, 2013, Ser. No. 61/775,709 which is incorporated herein by reference.

BACKGROUND

The following references provide brief description of the prior art:

[1] X. Zhou, "HW Efficient Carrier Recovery Algorithms for Single-Carrier QAM systems," in SPPCOM'12, OSA, paper SpTu3A.1 (2012).

[2] N. Sigron, I. Tselniker, and M. Nazarathy, "Carrier phase estimation for optically coherent QPSK based on Wiener-optimal and adaptive Multi-Symbol Delay Detection (MSDD)," Opt. Express 20, 1981-2003 (2012).

[3] I. Tselniker, N. Sigron and M. Nazarathy "Joint phase noise and frequency offset estimation and mitigation for optically coherent QAM based on adaptive multi-symbol delay detection (MSDD)," Opt. Express 20, 10944-10962 (2012).

[4] Nobuhiko Kikuchi, Shinya Sasaki, Tetsuya Uda, "Improvement of tolerance to intra-channel non-linear effect of coherent higher-order multilevel signaling with digital delay detection," in ECOC'12, We,3.C.1 (2012).

[5] S. Zhang, P.-yuen Kam, C. Yu, J. Chen, "Decision-aided carrier phase estimation for coherent optical communication," JLT 28, 1597 (2010).

[6] X. Liu and M. Nazarathy, "Coherent, self-coherent, and differential detection systems," Ch.1 in "Impact of Nonlinearities on Fiber Optic Communications, (ed Kumar), Springer (2011).

[7] T. Pfau, S. Hoffmann, and R. Noe, "HW-efficient coherent digital receiver concept with feedforward carrier recovery for QAM constellations," J. Lightwave Technol. 27, 989-999, (2009).

[8] J. Volder, "The CORDIC trigonometric computing technique," IRE Tran. Electronic Computers EC-8, 330-334 (1959).

[9] R. Andraka, "A survey of CORDIC algorithms for FPGA based computers," ACM/SIGDA FPGA '98, 191-200, (1998).

[10] Y. Atzmon, M. Nazarathy, "Laser Phase Noise in Coherent and Differential Optical Transmission Revisited in the Polar Domain," J. Lightwave Technol. 27, 19-29 (2009).

[11] T. Pfau, X. Liu, S. Chandrasekhar, "Optimization of 16-ary Quadrature Amplitude Modulation Constellations for Phase Noise Impaired Channels," paper Tu.3.A.6, European Conf. Opt. Comm., ECOC'11 (2011).

[12] M. Taylor, "Phase Estimation Methods for Optical Coherent Detection Using Digital Signal Processing," J. Lightwave Technol. 24 (2009).

[13] Q. Zhuge et al, "Linewidth tolerant low-complexity pilot-aided phase recovery for M-QAM using superscalar parallelization," OFC' 12.

[14] K. Itoh, "Analysis of the phase unwrapping algorithm," Applied Optics, 21, p. 2470 (1982)

[15] Gdeisat and Lilley, "One-Dimensional Phase Unwrapping Problem," available on the Internet at http://www.ljmu.ac.uk/GERI/CEORG_Docs/OneDimensional-Phase Unwrapping_Final.pdf.

Carrier recovery (CR) and in particular carrier phase and frequency estimation continue to pose performance and computational challenges, especially for higher order transmission constellations, imminent for deployment in the next phase of coherent optical communication systems upgrades for long-haul, metro and access applications.

A plethora of CR methods has been investigated [1]. Among those, Multi-Symbol Delay Detection (MSDD) [2-6] (alternatively referred to as Multi-Symbol Phase Estimation (MSPE) [6] or Maximum likelihood (ML) phase estimation [5]) is gradually gaining recognition as capable of delivering superior performance-complexity tradeoffs. In the wireless transmission context where it originated, MSDD was proven optimal for detection in white noise. In the optical transmission context, MSDD copes well with the combination of ASE, laser and nonlinear phase noises (PN) [4]. For QPSK systems, MSDD [2] is free of cycle slips and provides 1-2 dB OSNR lead over Viterbi & Viterbi CR, whereas for 16-QAM transmission, MSDD performance [3] trails by just a fraction of a dB below the extremely complex Blind Phase Search (BPS) CR [7], considered as a "benchmark". Numerous CR variants have recently been investigated based on two-staged processing using a coarse BPS first stage feeding a second CR stage realized by various methods [1]. Such CR systems claim substantial reductions of complexity vs. BPS at the expense of some performance degradation. To best of our knowledge, the MSDD CR method for 16-QAM [3] outperforms these other CR methods while still offering less complexity. However, there is still room for further complexity reduction of the MSDD CR sub-system.

SUMMARY

There is provide a system, a receiver and a method.

BRIEF DESCRIPTION OF THE DRAWINGS

FIG. 20 illustrates a MSDD according to an embodiment of the invention.

DETAILED DESCRIPTION OF THE DRAWINGS

Figure 1:
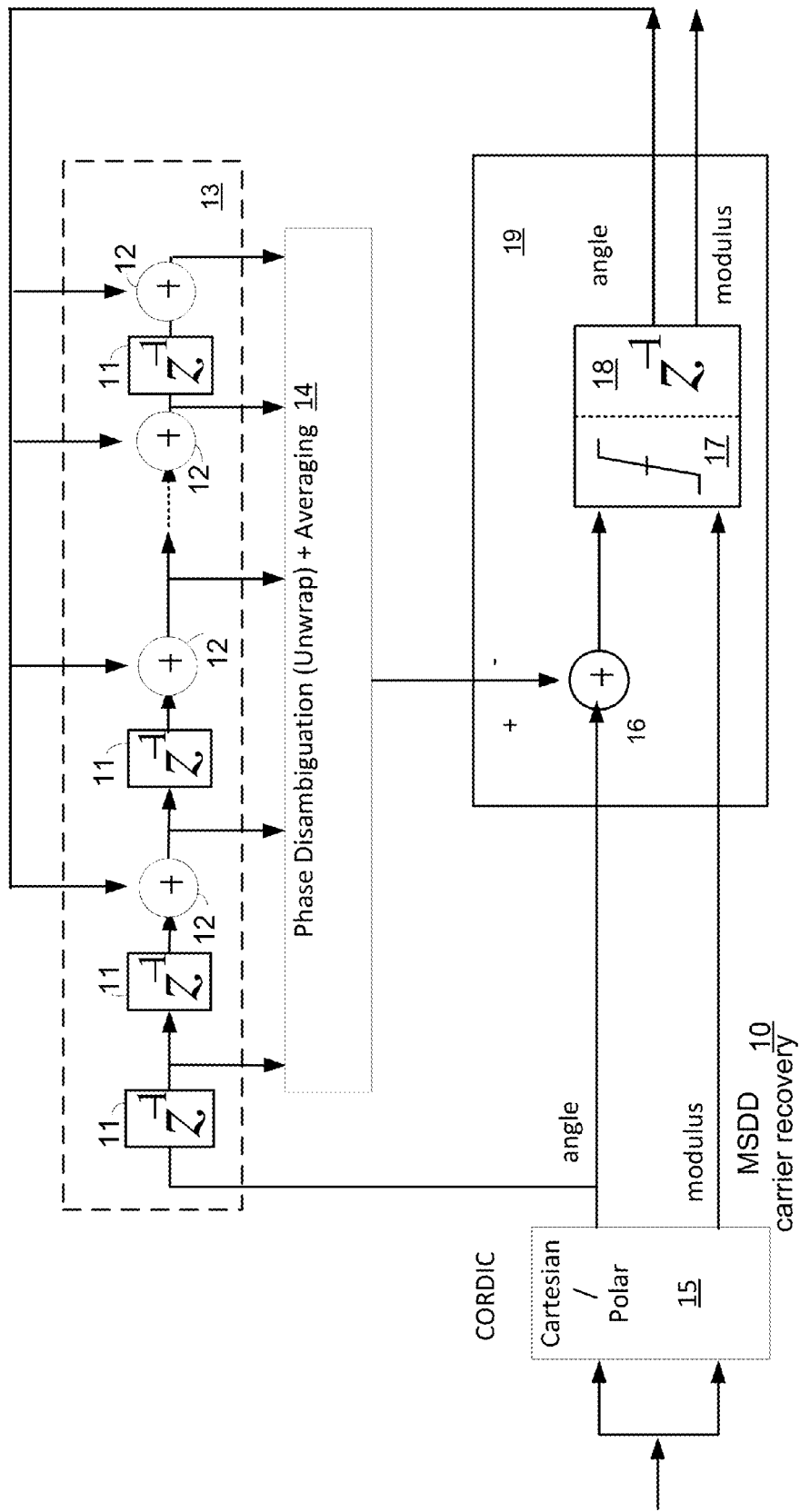
FIG. 1 illustrates a multi-polar delay detection module (MSDD) according to an embodiment of the invention.

According to an embodiment of the invention there is provided a polar multi symbol differential detection (MSDD) module. Some non-limiting examples of an MSDD module are provided in FIGS. 9, 10, 13 and 20.

The MSDD module (denoted 90, 100, 130 and 200 in FIGS. 9, 10, 13 and 20 respectively) may include an input unit (denoted 15 in FIGS. 9, 10, 13 and 20) that may be arranged to receive a current input symbol (denoted 301 in FIG. 9); and output a current phase signal (denoted 302 in FIG. 9) and current amplitude signal (denoted 303 in FIG. 9) that represent a phase and an amplitude of the current input symbol, respectively.

The MSDD module (90, 100, 130 and 200) may include a phase estimator that may be arranged to:

Receive (a) the current phase signal (302) and (b) an estimate (305) of a phase of a last input symbol that preceded the current input symbol.

Figure 9:
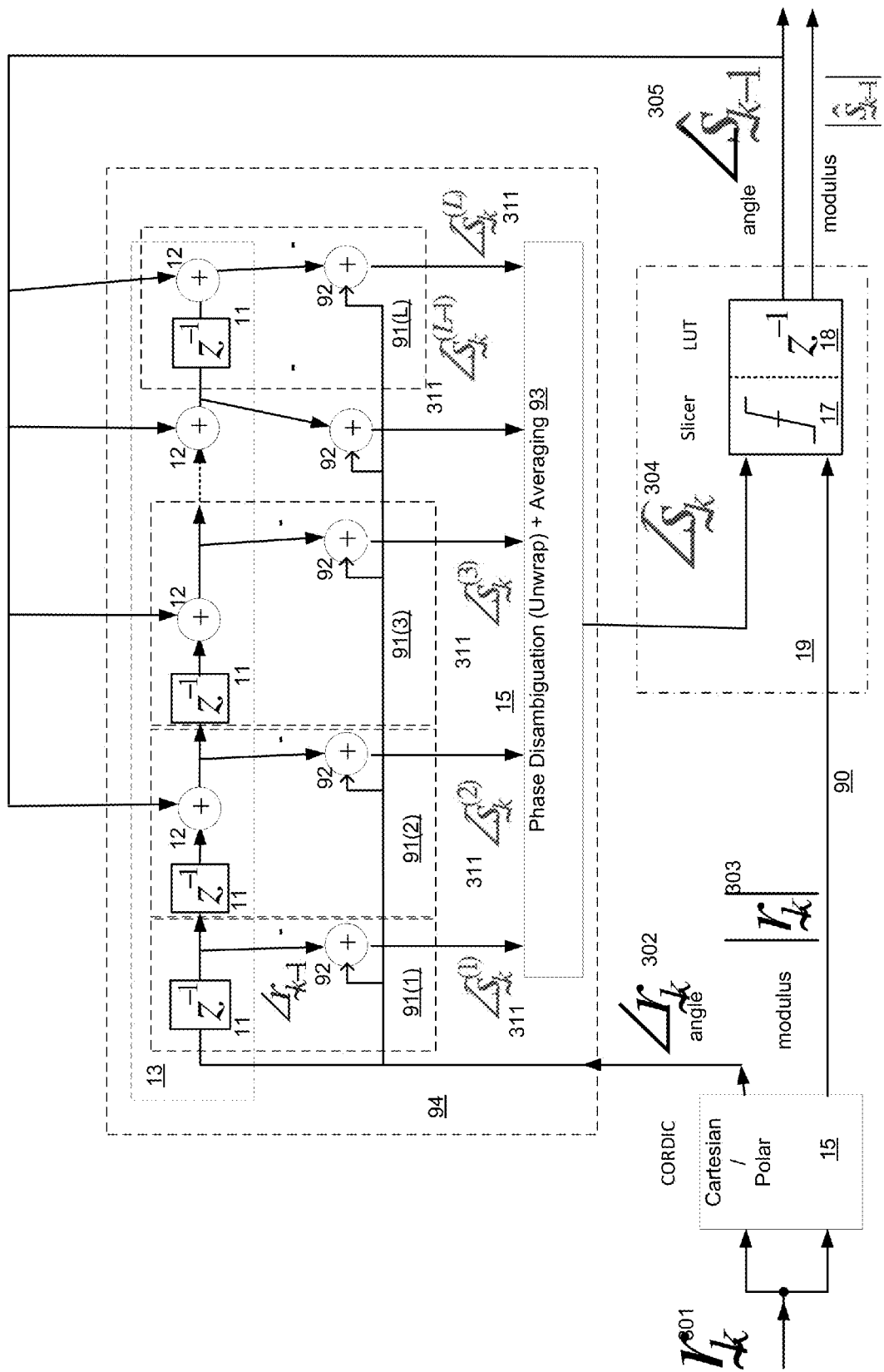
FIG. 9 illustrates an MSDD according to an embodiment of the invention.

Generate multiple partial phase estimates (denoted 311 in FIG. 9). The plurality of the multiple partial phase estimates of the multiple phase estimates are responsive to (i) phase signals representative of phases of a plurality of input symbols that preceded the current input symbol, and (ii) estimates of the phase of the plurality of input symbols.

Output a reconstructed phase 305 of the current input symbol, wherein the estimate of the reconstructed phase is response to, at least, the multiple partial phase estimates.

The phase estimator may include multiple (L) partial phase estimation circuits (such as 91(1)-91(L) of FIG. 9). For index l that ranges between a low limit (for example 2) and L, a l'th partial phase estimation circuit may be arranged to calculate an l'th partial phase estimate that is a difference between the current phase signal and between a sum of phase signals of a last till l'th input symbols that preceded the current input symbols and estimates phases of the last till l'th input symbols that preceded the current input symbol.

The low limit may equal two the phase estimator may include a first partial phase estimation circuit (91(1)) that may be arranged to calculate a first partial phase estimate that is a difference between the current phase signal and a last phase signal, the last phase signal represents a phase of a last input symbol that preceded the current input symbol.

The phase estimator may include a slicer 17, a lookup table 18 and the like.

The phase estimator may include a phase unwrapping circuit (denoted 112 in FIG. 20) that may be arranged to receive the multiple partial phase estimates and to provide multiple unwrapped partial phase estimates.

The phase estimator may include an averaging circuit (denoted 113 in FIG. 20) for averaging the multiple unwrapped partial phase estimates to provide an average phase estimate.

Figure 10:
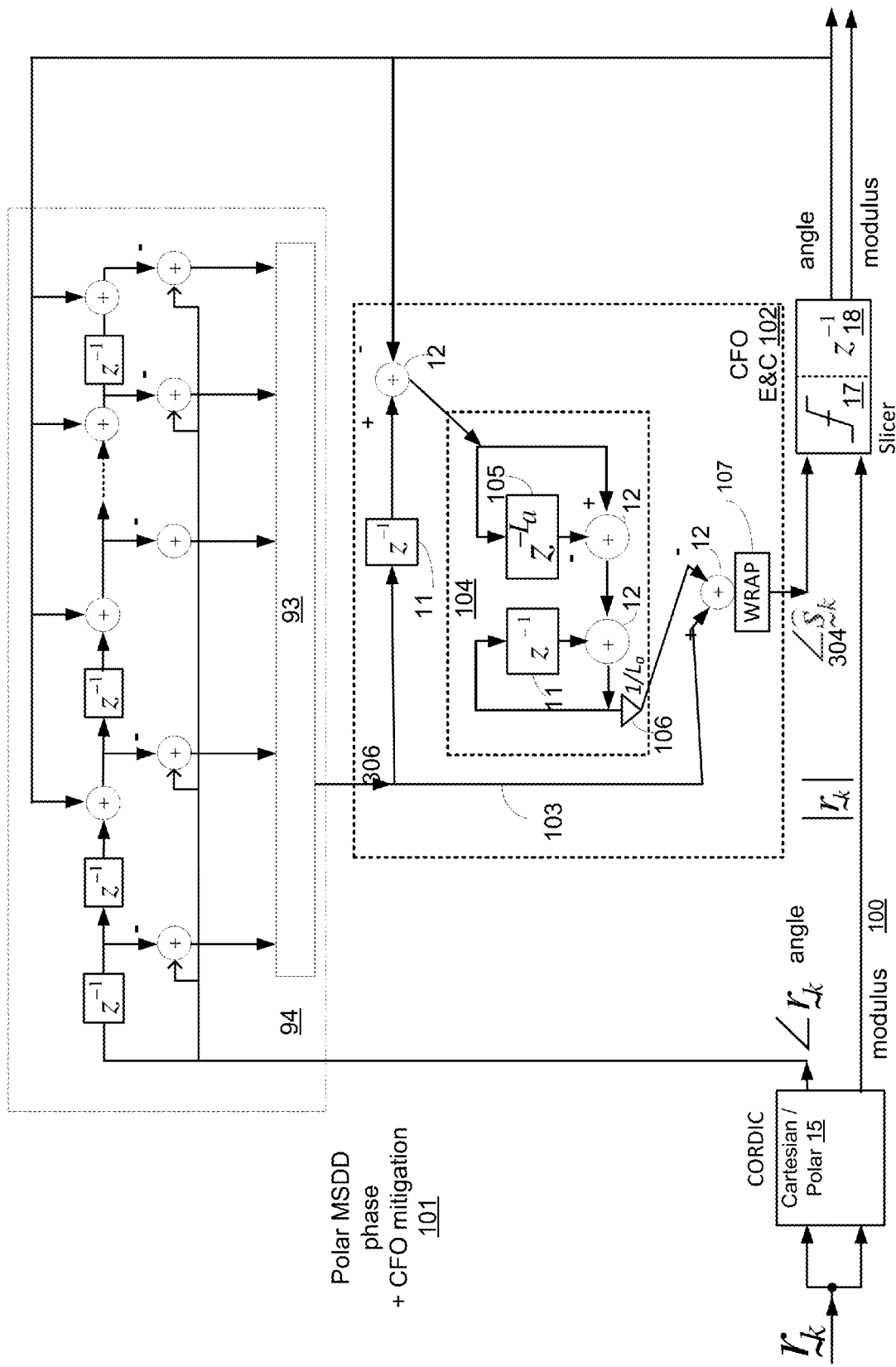
FIG. 10 illustrates an MSDD according to an embodiment of the invention.
Figure 13:
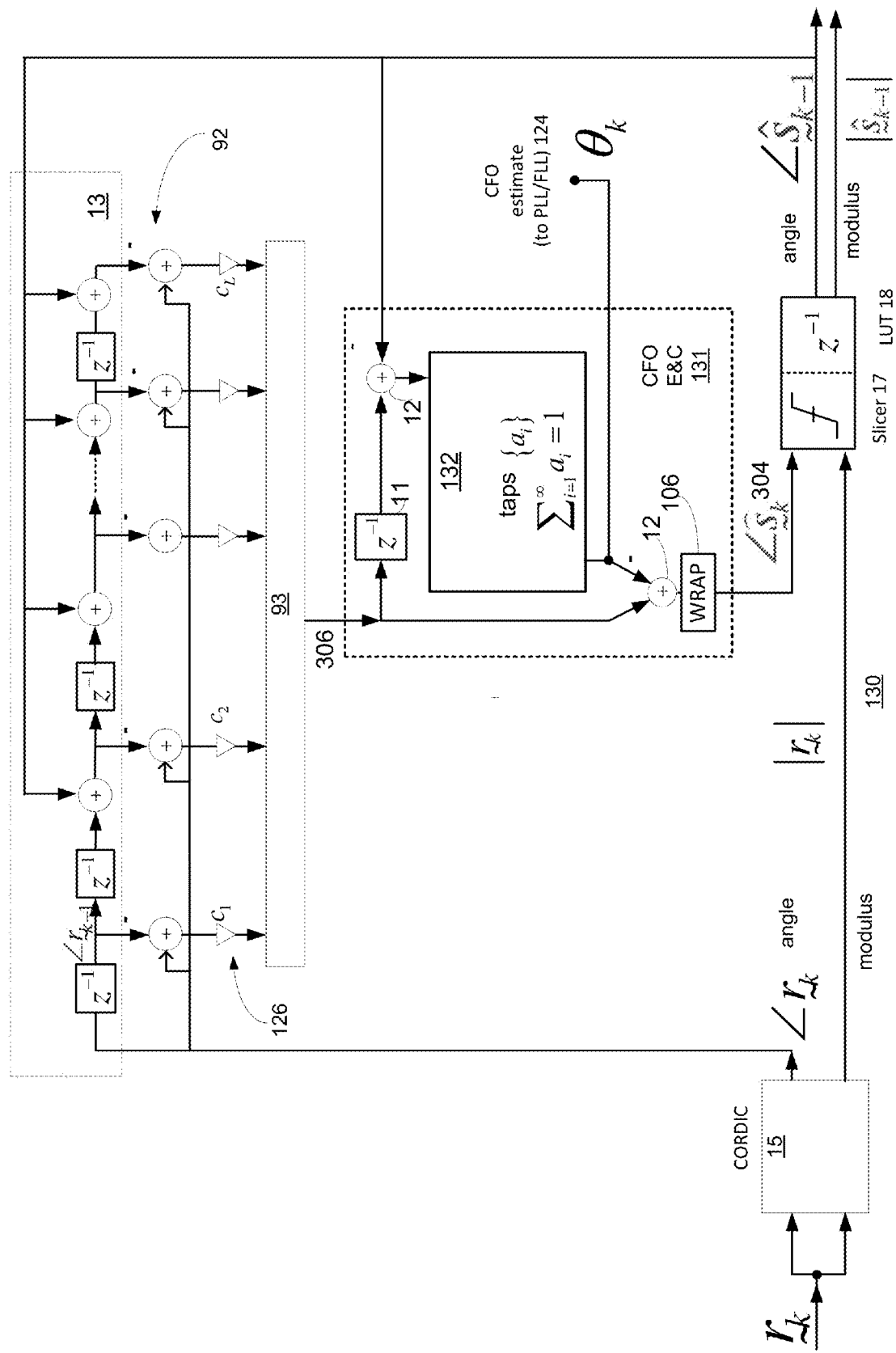
FIG. 13 illustrates an MSDD according to an embodiment of the invention.

The phase estimator may include a phase unwrapping and averaging circuit (denoted 93 in FIGS. 9, 10 and 13) that may be arranged to receive the multiple partial phase estimates, to calculate multiple unwrapped partial phase estimates and to perform an averaging operation to provide an average phase estimate (denoted 304 in FIGS. 9 and 306 in FIGS. 10 and 13).

The phase estimator may include a slicer 17 that may be arranged to receive the average phase estimate and to output the estimate of the reconstructed phase of the current input symbol.

The phase estimator may include a carrier frequency offset (CFO) estimator. Various CFO estimators are illustrated in FIGS. 10-13 and 16-20. See, for example, CFO estimators 102, 115, 121, 131 of FIGS. 10-13, CFO estimator 121 of FIGS. 16-19, and CFO estimator 208 of FIG. 20.

The CFO estimator may include a constant CFO phase rotation circuit (see, for example boxes 104, 111, 122, 132 of FIGS. 10-13) that may be arranged to calculate an estimate of a constant CFO phase rotation.

The CFO estimator may include an input port for receiving an CFO estimator input signal (see, for example signal 103 of FIG. 10) and a subtraction unit 12 that may be arranged to calculate a difference between the CFO estimator input signal and the estimate of the constant CFO phase rotation (output signal of box 111 of FIG. 10) to provide a CFO estimator signal, wherein the reconstructed phase of the current input symbol is a function of the an CFO estimator signal.

The CFO estimator may include a wrap unit (such as wrap unit 107 of FIG. 10) arranged to receive the CFO estimator signal and provide a wrapped CFO estimator signal 306; wherein the polar MSDD module may include a slicer that may be arranged to receive the wrapped CFO estimator signal and output the estimate of the reconstructed phase of the current input symbol.

The CFO estimator wherein the constant CFO phase rotation circuit may be arranged to calculate the estimate of a constant CFO phase rotation by calculating a moving average (see, for example, boxes 104, 111, 122, 132 of FIGS. 10-13) of CFO estimator input signals.

There may be provided a method for calculating a reconstructed phase, the method may include: receiving a current input symbol; calculating a current phase signal and current amplitude signal that represent a phase and an amplitude of the current input symbol, respectively; generating, in response to the current phase signal and an estimate of a phase of a last input symbol that preceded the current input symbol, multiple partial phase estimates, wherein a plurality of the multiple partial phase estimates of the multiple phase estimates are responsive to (i) phase signals representative of phases of a plurality of input symbols that preceded the current input symbol, and (ii) estimates of the phase of the plurality of input symbols; and calculating a reconstructed phase of the current input symbol, in response to, at least, the multiple partial phase estimates.

According to an embodiment of the invention there is provided a polar multi symbol differential detection (MSDD) module. Some non-limiting examples of an MSDD module are provided in FIGS. 12 and 16-19.

The polar multi symbol differential detection (MSDD) module may include an input unit (15) that may be arranged to receive a current input symbol; and output a current phase signal and current amplitude signal that represent a phase and amplitude of the current input symbol, respectively.

The MSDD module (120, 160, 170, 180 and 190 of FIGS. 12, 16-19 respectively) may include a phase estimator that may be include a first circuit (such as circuit 118 of FIGS. 11 and 12) that may be arranged to:

Receive (a) the current phase signal and (b) an estimate of a phase of a last input symbol that preceded the current input symbol.

Figure 11:
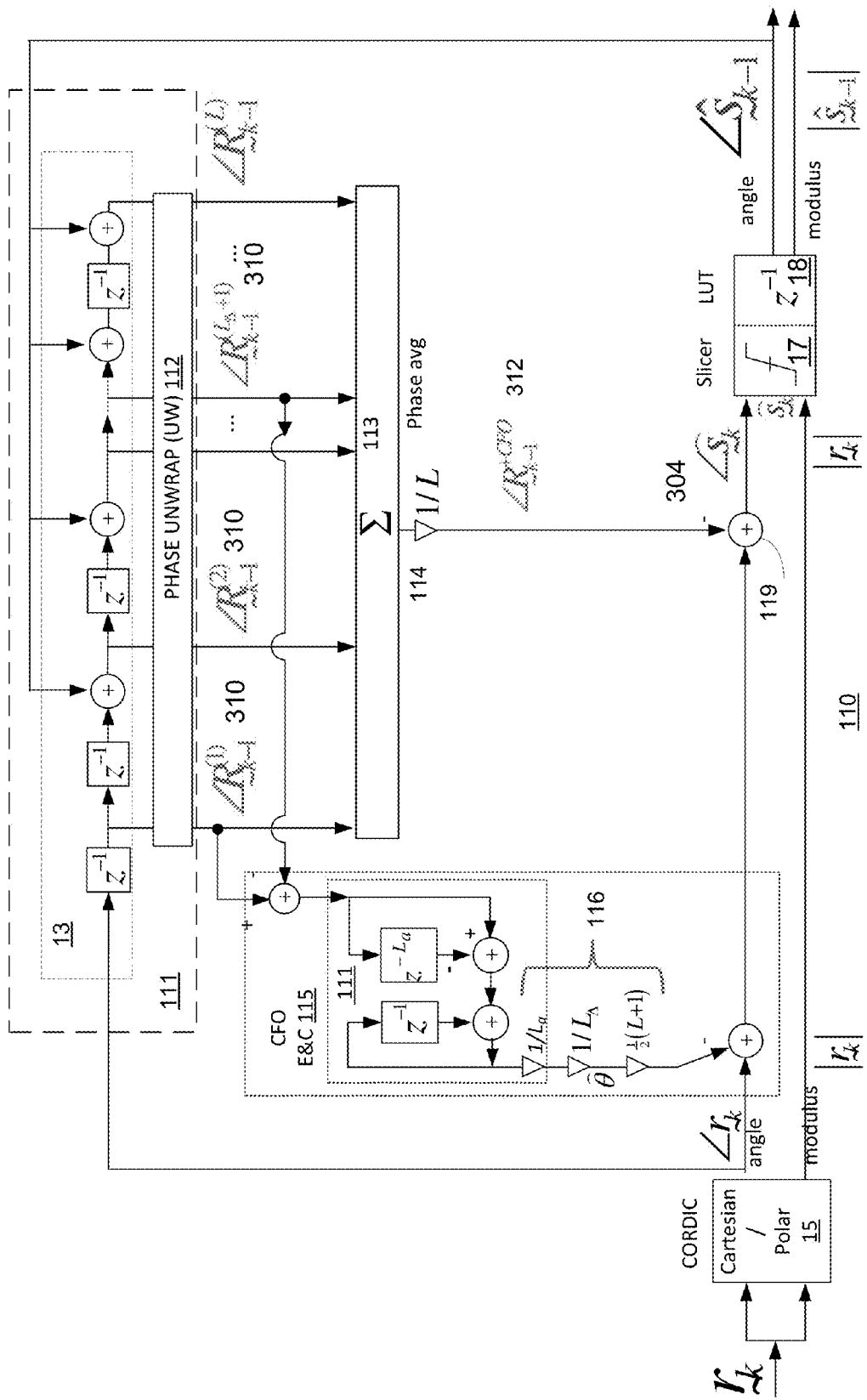
FIG. 11 illustrates a phase unwrap and averaging circuits according to embodiments of the invention

Generate multiple partial references (denoted 310 in FIG. 11). A plurality of partial references of the multiple partial references are responsive to (i) phase signals representative of phases of a plurality of input symbols that preceded the current input symbol, and (ii) estimates of the phase of the plurality of input symbols.

The MSDD module may include a phase unwrap circuit (112) that may be arranged to receive the multiple partial references and calculate unwrapped partial references.

The MSDD module may include a carrier frequency offset (CFO) module that may be arranged to estimate a constant CFO phase rotation in response to the unwrapped partial references.

The MSDD module may include an output circuit that may be arranged to output a reconstructed phase of the current input symbol, wherein the estimate of the reconstructed phase is response to, at least, the estimate of the constant CFO phase rotation and to the unwrapped partial references.

The CFO estimator may include a moving average circuit (see, for example, boxes 111, 122 of FIGS. 11-12 and box 122 of FIGS. 16-19) for calculating the estimate of the constant CFO phase rotation in response to a difference between at least two of the unwrapped partial references.

The CFO estimator may include a moving average circuit that may be arranged to receive only a part (see, for example FIGS. 11 and 19) of the unwrapped partial references and to calculate the estimate of the constant CFO phase rotation.

The polar MSDD module may include a first weighted sum module (see, for example box 123 of FIG. 12) that may be arranged to calculate a first weighted sum of the unwrapped partial references.

The CFO estimator may include a moving average circuit (box 208 of FIG. 20) that may be arranged to calculate a first partial weighted sum (by adder 202) of a first part of the unwrapped partial references, to calculate a second partial weighted sum (by adder 203) of a second part of the unwrapped partial references, and calculate a difference (by subtraction unit 12 of MISO filter 201 of FIG. 20) between the first and second partial weighted sums, and to provide the difference to a moving average circuit.

The output circuit may be arranged to subtract (see subtraction unit 119 of FIGS. 11 and 12) the first weighted sum of the unwrapped partial references from the estimate of the constant CFO phase rotation.

The CFO estimator may include a moving average circuit (See box 131 of FIG. 13) for calculate an estimate of a constant CFO phase rotation in response to the second weighted sum of the unwrapped partial references.

The CFO estimator may include (see FIG. 20) a second weighted sum module that may be arranged to calculate a second weighted sum of the unwrapped partial references; a moving average circuit for calculate an estimate of a constant CFO phase rotation in response to the second weighted sum of the unwrapped partial references; an amplifier that may be arranged to amplify the estimate of the constant CFO phase rotation to provide an amplified signal; and a subtraction unit for subtracting the amplified signal from the current phase signal to provide a first difference signal.

The CFO estimator may include (See FIG. 20) an input port for receiving an CFO estimator input signal and a subtraction unit that may be arranged to calculate a difference between the CFO estimator input signal and the estimate of the constant CFO phase rotation to provide a CFO estimator signal, wherein the reconstructed phase of the current input symbol is a function of the an CFO estimator signal.

The CFO estimator may include a wrap unit (see FIG. 10) arranged to receive the CFO estimator signal and provide a wrapped CFO estimator signal; wherein the polar MSDD module may include a slicer that may be arranged to receive the wrapped CFO estimator signal and output the estimate of the reconstructed phase of the current input symbol.

There may be provided a method for calculating a reconstructed phase, the method may include: receiving a current input symbol; calculating a current phase signal and current amplitude signal that represent a phase and an amplitude of the current input symbol, respectively; generating, in response to the current phase signal and an estimate of a phase of a last input symbol that preceded the current input symbol, multiple partial references, wherein a plurality of partial references of the multiple partial references are responsive to (i) phase signals representative of phases of a plurality of input symbols that preceded the current input symbol, and (ii) estimates of the phase of the plurality of input symbols; calculating unwrapped partial references; estimating a constant carrier frequency offset (CFO) phase rotation in response to the unwrapped partial references; calculating a reconstructed phase of the current input symbol, wherein the estimate of the reconstructed phase is response to, at least, the estimate of the constant CFO phase rotation and to the unwrapped partial references.

There is provided in real-time FPGA or ASIC a novel MSDD CR for 16-QAM coherent transmission which is multiplier-free yet attains the same performance as the U-notU variant of MSDD CR disclosed in [2,3].

Any reference to any type of integrated circuit should be interpreted as a reference to any other type of integrated circuit. For example, any reference to an FPGA should be also interpreted as a reference to an ASIC and vice versa.

We implement the new polar MSDD in FPGA or ASIC and demonstrate its real-time HW operation by having it embedded in an off-line pre-computed optical transmission chain which is nevertheless processed by the MSDD FPGA in real-time at full baud-rate speed (25 GBd for example).

The full-speed full-channel HW operation is enabled by a new technique for temporal parallelization of the MSDD HW processing, referred to here as Polyblock Parallelization.

I. Polar-Domain MSDD Carrier Recovery (Phase Recovery Only Version)

A. Theory of Operation

The novel polar-domain MSDD format for 16-QAM uses the CORDIC algorithm [8,9] (add-and-shift and simple logic, no multipliers) to extract the phase angle of the noisy symbol, $r_k$, incoming into the MSDD, then performs all its internal manipulations in the angular (phase)) domain, eliminating HW-intensive processing of complex-numbers.

As a brief pre-requisite As in [2,3] and also as explained in our prior MSDD patent (which went PCT) the MSDD presumes a differential precoder (DP) in the transmitter, and also in our references of the manuscript above.

We shall use, as in [2,3], the "inverted-moon" notation $\check{x} \equiv x/|x|$ to denote unity-modulus ($|\check{x}|=1$) normalization (which is angle-preserving, $\angle \check{x} \equiv \angle x$). In this notation the differential precoding (DP) we use at the transmitter is as follows: the information symbols $S_k$ of the QAM constellation alphabet are mapped by a modulus preserving differential precoder (DP) [Kikuchi] into line symbols, $\underline{A}_k = \underline{S}_k \underline{\check{A}}_{-1}$. Taking the phase argument of both sides this amounts to $$\angle \underline{A}_k = \angle \underline{S}_k + \angle \underline{\check{A}}_{k-1} = \angle \underline{S}_k + \angle \underline{A}_{k-1} \Leftrightarrow \angle \underline{s}_k = \angle \underline{A}_k - \angle \underline{\check{A}}_{k-1}, \quad (1)$$

whereas taking the absolute value yields, $|\underline{A}_k| = |\underline{S}_k|$.

This indicates that our DP differentially encodes phase as in Differential Phase Shift Keying systems ($\angle \underline{S}_k = \angle \underline{A}_k - \angle \underline{\check{A}}_{k-1}$, thus information is encoded in the phase difference of transmitted line samples), however the magnitude is preserved, allowing to apply DP and reconstruct in the receiver arbitrary constellations such as m-QAM or ring constellations.

A conventional delay detector (or self-homodyne or differential phase detector) generates the decision variable $\underline{\check{S}}_k = \underline{r}_k \underline{\check{r}}_{k-1}^*$, which in the phase domain corresponds to $\angle \underline{\check{S}}_k = \angle \underline{r}_k - \underline{r}_{k-1} = \angle \underline{r}_k - \underline{\check{r}}_{k-1} \cong \angle \underline{A}_k - \angle \underline{\check{A}}_{k-1} = \angle \underline{S}_k$. Thus, in the absence of noise the angle $\angle \underline{\check{S}}_k$ of the sample which is sliced is ideally equal to the transmitted data angle $\angle \underline{s}_k$.

Notice that the DP phase relation of Eq. (1) implies the following extended recursion (a result to be used in the sequel):

$$\angle \underline{A}_k = \angle \underline{A}_{k-i} + \angle \underline{S}_{k-i+1} + \angle \underline{S}_{k-i+2} + \ldots + \angle \underline{S}_k \quad (2)$$

For example, $\angle \underline{A}_k = \angle \underline{A}_{k-2} + \angle \underline{S}_{k-1} + \angle \underline{S}_k$ The previously disclosed "complex-domain" MSDD CR (in its U-notU flavor) [2,3] generates an improved reference $\underline{R}_{k-1}$, to be used instead of the previous sample $\underline{r}_{k-1}$, in order to demodulate $\underline{r}_k$ prior to decision: $\underline{\hat{S}}_k = \underline{r}_k \underline{\check{R}}_{k-1}^*$, with $\underline{R}_{k-1}$ expressed in terms of the slicer decision $\underline{\check{s}}_{k-i}$ in response to $\underline{\hat{S}}_{k-i-1}$:

$$\underline{R}_{k-1} = \underline{\check{r}}_{k-1} + \underline{\check{r}}_{k-2} \underline{\tilde{\hat{S}}}_{k-1} + \underline{\check{r}}_{k-3} \underline{\tilde{\hat{S}}}_{k-2} \underline{\tilde{\hat{S}}}_{k-1} + \ldots + \underline{\check{r}}_{k-L} \underline{\tilde{\hat{S}}}_{k-L+1} \underline{\tilde{\hat{S}}}_{k-L+2} \cdots \underline{\tilde{\hat{S}}}_{k-1}. \quad (3)$$

FIG. 1 illustrates a Polar MSDD efficient multiplier-free realization 10. It includes (a) a delay and adder circuit 13 that included delay units 11 and adders 12, (b) an input circuit 15, and (c) an output circuit 19 that may include adder 16, slicer 17 and lookup table 18. The received samples are converted to polar form by the multiplier-free CORDIC module. The slicer decision regions are also formulated in the polar domain. The modulus from the CORDIC is directly passed to the slicer. The angle is processed by correcting past samples by the angles of the prior decisions (which are stored in the slicer) then averaging and disambiguating the resulting corrected angles. The final MSDD phase estimate is then subtracted from the angle of the received symbol prior to being presented to the slicer.

Thus, MSDD is a decision-feedback based CR (but quite different from a decision-driven PLL). This algorithm (see block-diagram in FIG. 1 of [3]) requires complex multiplications (CM) and inverted-moon normalization ops in the cartesian domain (namely complex operations such as CMs defined in terms of I,Q Cartesian components).

Here we show that all the MSDD processing may be preferably performed in the angular domain, as per FIG. 1. We extract the angles or $\phi_r[k] \equiv \angle \underline{r}_k$ means of the CORDIC algorithm, store the angles $\phi_S[k] \equiv \angle \underline{s}_k$ of the 16-QAM constellation points in the slicer, define $\phi_R[k] \equiv \angle \underline{R}_{k-1}$ and design an appropriate mapping processing the angles in a way mirroring the complex-domain processing used to generate $\underline{R}_{k-1}$ in the original algorithm. Once the phase $\phi_R[k]$ of the improved reference is obtained, the final demodulation $\underline{\hat{S}}_k = \underline{r}_k \underline{\check{R}}_{k-1}^*$ just reduces to a phase subtraction: $\angle \underline{\hat{S}}_k \equiv \hat{\phi}_S[k] = \phi_r[k] - \phi_R[k-1]$.

The derivation of the angular-domain block diagram from the complex (Cartesian-domain) block diagram disclosed in [2,3] involves the following PN exponent commutation (PNEC) approximation:

$$\frac{1}{L} \sum_{i=1}^{L} e^{j\psi_i} \cong e^{j\frac{1}{L}\sum_{i=1}^{L}\psi_i} \quad (4)$$

A similar approximation (in continuous rather than discrete-time) was shown in [10] to be surprisingly accurate over a wide angular range. From the identity $$e^{j\frac{1}{L}\sum_{i=1}^{L}\psi_i} = \left(\prod_{i=1}^{L} e^{j\psi_i}\right)^{1/L}$$

it follows that Eq. (4) is equivalent to $$\frac{1}{L} \sum_{i=1}^{L} e^{j\psi_i} \cong \left(\prod_{i=1}^{L} e^{j\psi_i}\right)^{1/L},$$

indicating that PNEC effectively states that the geometric mean of L uni-modular phasors may be used in this case to well approximate their arithmetic mean (notice that for real-valued numbers the geometric mean generally falls under the arithmetic mean, here for complex-valued unimodular numbers the two means track each other well). Note that L-th root extraction in the complex-domain introduces an $$\text{integer} \cdot \frac{1}{L} 2\pi$$

phase ambiguity, requiring a disambiguation algorithm realized by simple boolean logic, as detailed next.

B. Phase Disambiguation (Unwrap) and Averaging Algorithm

The PNEC approximation (4) may be equivalently expressed as by extracting the angle (phase)) of both sides:

$$\angle \left\{ \frac{1}{L} \sum_{i=1}^{L} e^{j\psi_i} \right\} \cong \frac{1}{L} \sum_{i=1}^{L} \psi_i. \quad (5)$$

1. Let us assume that angles are represented modulo $[-\pi, \pi)$, writing $\psi_i = \psi_i^0 + 2\pi N_i$ with $\psi_i^0 \in [-\pi,\pi)$ called the principal part of $\psi_i$ (equivalent results hold for a modulo $[0,2\pi)$ representation). Evidently, the left-hand-side of (5) is unaffected by whatever selection of $N_i$ (due to the periodicity of the complex exponents), however the RHS changes by integer multiples of $2\pi/L$, whenever $\psi_i$ are represented with different $N_i$ factors. It turns out that there exist selections of $N_i$ which make the two sides of (5) approximately equal. These proper $N_i$ values may be determined in terms of the collection of angles $\{\psi_i^0\}_{i=1}^L$ according to the following disambiguation algorithm: Classify the angles $\{\psi_i^0\}_{i=1}^L$ according to their quadrant, $Q_q \equiv [q\pi/2, (q+1)\pi/2)$, $q=0,1,2,3$. Let the subset of angles falling in the q-th quadrant be denoted by $A_q$ (thus $\psi_i^0)_{i=1}^L = A_1 \cup A_2 \cup A_3 \cup A_4$). Further denote the number of angles falling in the q-th quadrant by $\#A_q$.

2. If $\#A_2 \geq 1$ and $\#A_3 \geq 1$ then represent the angles $A_3$ as $\psi_i = \psi_i^0 + 2\pi$, i.e. add $2\pi$ to the principal parts of all angles in the third quadrant, whereas the angles in the other quadrants are just represented by their principal parts. Else (if either $A_2=0$ or $A_1=0$) then represent all angles by their principal parts.

3. Take the arithmetic mean of all angles as represented as in point 2:

$$\bar{\psi} \equiv \frac{1}{L} \sum_{i=1}^{L} \psi_i \cong \angle \left\{ \frac{1}{L} \sum_{i=1}^{L} e^{j\psi_i} \right\}$$

This arithmetic mean then provides a good approximation for the angle of the arithmetic mean of the corresponding phasors.

The principle of operation of the algorithm is outlined in the next subsection. This phase disambiguation and averaging algorithm generically provides an excellent approximation for a collection of angles that are mostly close to each other (with the exception of a few, say one or two, isolated outliers), which is typically the case for phase-noisy reception.

The phase disambiguation described here is a simplified special case of more general phase unwrap algorithms to be introduced later in the disclosure to address the more demanding case when frequency offset is also present.

In the context of polar MSDD, the disambiguated averaging algorithm is applied to select the proper representations of the following set of L angles, $$\angle\{\check{r}_{k-1}\}, \angle\{\check{r}_{k-2}\tilde{\tilde{S}}_{k-1}\}, \angle\{\check{r}_{k-3}\tilde{\tilde{S}}_{k-2}\tilde{\tilde{S}}_{k-1}\} \ldots \angle\{\check{r}_{k-L}$$
$$\tilde{\tilde{S}}_{k-L+1} \tilde{\tilde{S}}_{k-L+2} \ldots \tilde{\tilde{S}}_{k-1}\} \quad (6)$$

as generated in the top part of FIG. 1, such that their mean angle yield $\angle R_{k-1}$ (FIG. 1). Notice that each of the angles (6), entering the disambiguated average, may be individually used as a phase "partial estimate" to be subtracted from the angle $\angle \check{r}_k$ of the noisy received signal, nevertheless it is their mean that provides an improved overall phase estimate, reducing white phase noise due to the averaging effect. This averaged phase estimate is subtracted out from the angle $\angle \check{r}_k$ of the noisy received signal, finally yielding a corrected phase for the received symbol, used as the angular component presented to the slicer along with the modulus component, $|\check{r}_k|$ as depicted in FIG. 1.

Disambiguation Algorithm Principle

To understand the principle of operation of the algorithm, let us first consider a specific example for L=2, $\#A_2=1=\#A_3$, i.e., one angle in the second quadrant, represented by its principal part $\psi_1^0 = \pi - \delta\psi_1$, $\delta\psi_1 \in [0, \pi/2)$ and another angle in the third quadrant $\psi_2^0 = -\pi + \delta\psi_2, \delta\psi_2 \in [0, \pi/2)$.

If we just averaged the angles as represented by their principal parts, we would obtain an angle pointing in the right-half-plane ($Q_1 \cup Q_4$)

$$\tfrac{1}{2}(\psi_1+\psi_2) = \tfrac{1}{2}(\psi_1^0+\psi_2^0) = \tfrac{1}{2}[(\pi-\delta\psi_1)+(-\pi+\delta\psi_2)]$$
$$= \delta\psi_2 - \delta\psi_1 \in [-\tfrac{1}{2}\pi, \tfrac{1}{2}\pi] \quad (11)$$

However, this average angle does not coincide with that of the two phasors resultant (which falls in the left-hand plane), but is rather antipodal to it (this is readily exemplified by assuming small deviations, $\delta\psi_1, \delta\psi_2 \ll 1$, though the conclusion generally holds for any deviations in the range $[0, \pi/2)$. Notice that the resultant of two phasors both in the left-hand plane, $Q_2 \cup Q_3$, always falls in the left-hand plane, as the individual angles do. This indicates that we must modify at least one of the two input angles representations such that their mean end up in the left-hand plane. In this case, according to the disambiguation algorithm, we must add $2\pi$ to the angle falling in $Q_3$, making the substitution $\psi_2 = \psi_2^0 + 2\pi$, while still representing the angle falling in $Q_2$ by its principal part, $\psi_1 = \psi_1^0$. After this correction we have:

$$\frac{1}{2}(\psi_1+\psi_2) = \frac{1}{2}[\psi_1^0 + (\psi_2^0 + 2\pi)] \quad (12)$$
$$= \frac{1}{2}[(\pi - \delta\psi_1) + (-\pi + \delta\psi_2 + 2\pi)]$$
$$= \delta\psi_2 - \delta\psi_1 + \pi \in Q_2 \cup Q_3$$

More generally, assuming first an arbitrary number of angles in $Q_2, Q_3$ (at least one of them in each of these two quadrants, the justification of adding $2\pi$ to the principal part of each angle in $Q_3$ is that each such angle, say $\psi_i \in A_3$, is going to be represented in the form $$\psi_i = \psi_i^0 + 2\pi = (-\pi + \delta\psi_i) + 2\pi = \pi + \delta\psi_i, \quad (13)$$

whereas each angle in $Q_2$ is going to be represented in the form $\psi_j = \psi_j^0 = \pi - \delta\psi_j$. Both of these representations are in a CCW one-sided form, therefore their arithmetic mean correctly represents the mean of their corresponding phasors. More generally, one can verify that whenever all angles fall in a particular half-plane $Q_1 \cup Q_2 \cup Q_3$, $Q_3 \cup Q_4$, $Q_4 \cup Q_1$, then the proposed disambiguation algorithm functions perfectly. Finally, let us address the case where most of the angles are in a particular half-plane whereas a low number of outlier angles fall in the complementary half-plane. The most problematic case is again having the majority of the angles fall in $Q_3 \cup Q_4$ (at least one angle in the left half-plane) but having say one or two outlier angles fall in either $Q_1$ or $Q_2$. In this case the algorithm will still function well whenever the outlier angles are incapable of pulling the resultant of the phasors outside the left-half-plane. As we assume that the number of outliers is small (one or at most two) this is a highly probable event.

Figure 2:
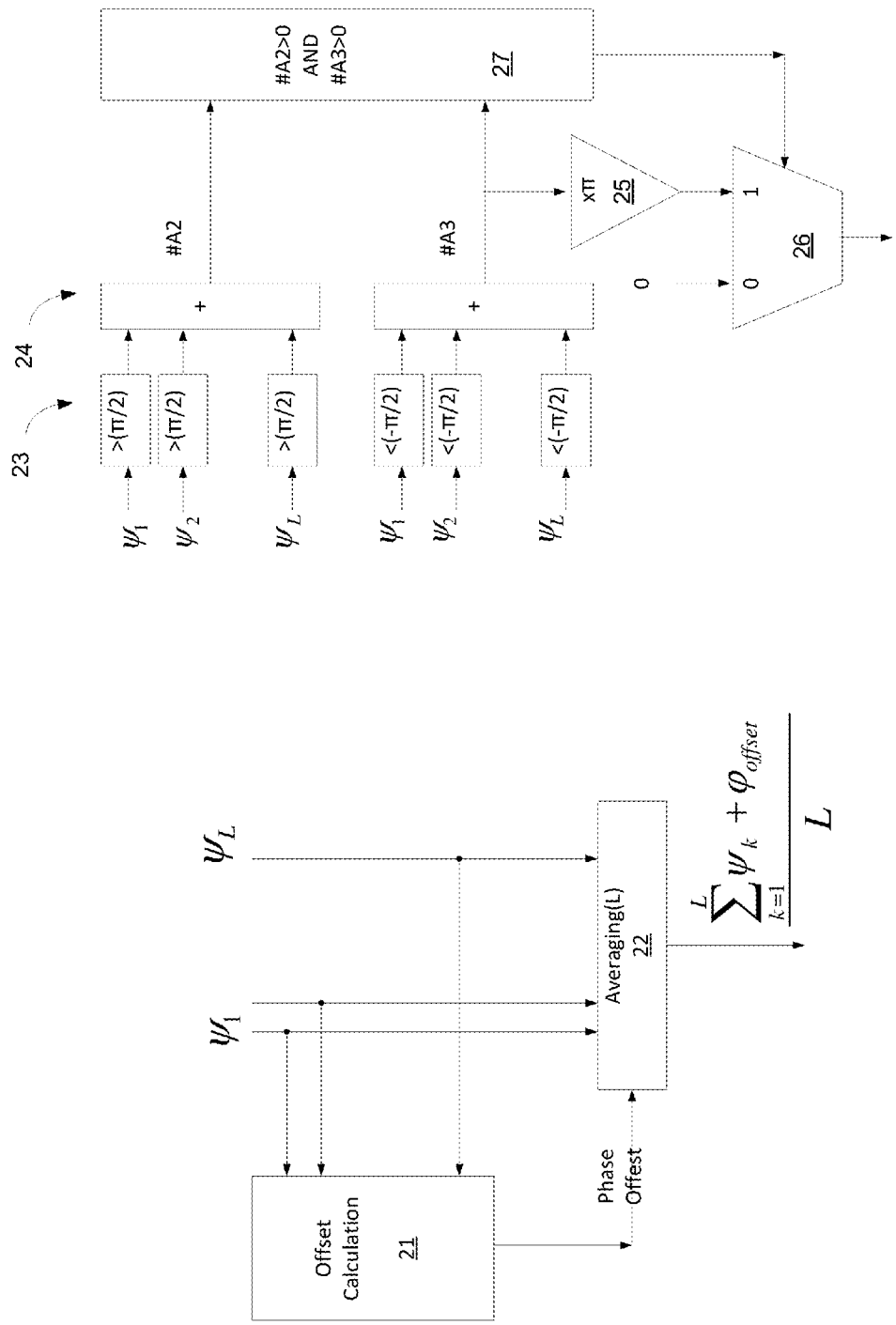
FIG. 2 illustrates a conceptual digital implementation of the phase disambiguation and averaging algorithm according to an embodiment of the invention.

FIG. 2 illustrates a conceptual digital implementation of the phase disambiguation and averaging algorithm according o an embodiment of the invention. Left part of the figure illustrates an overall block diagram including offset calculation module 21 and averaging module 22. Right part of figure illustrates the internal structure of offset calculation module 21. Including comparators 23 to phi/2, adders 24 that output signals #A2 and #A3, a A2 and A34 positive evaluator 27, a not gate 25 and a multiplexer 26 controlled by evaluator 27 and outputs either zero of #A3. The modules marked >θ(θ=±π/2, which may be encoded as θ=±1 measured in units of phi/2) are comparators outputting 1 if input exceeds that angle, zero otherwise.

Polar MSDD Hardware Realization Complexity

The proposed polar MSDD structure brings down the CR sub-system complexity to bottom level (without sacrificing performance) as we manage to eliminate all multipliers altogether. We even remove the complex multiplier used for demodulating the noisy signal prior to slicing (multiplication by $\exp\{-j\phi_k^{est}\}$ prior to slicing, where $\phi_k^{est}$ is the estimated phase). Indeed, the conjugate multiplication entailed in the demodulation reduces in the angular domain to a simple subtraction of phase s.

The resulting multiplier-free CR comprises just a reasonably low quantity of simpler elementary operations: additions, comparators, a lookup table for the slicer angular outputs (e.g., 8 bit phase and 8 bit magnitude for the slicer input, i.e., 16 bit input and 4 bit cells for 16QAM, thus a LUT of 256 Kbit) simple comparators logic (for CORDIC and disambiguation), trivial digital word shifts (to divide or multiply by a power-of-two) and block serial-parallel data re-shuffling. These hardware operations are far less complex than multiple complex multiplications (as typically used in other CR schemes). By using the new MSDD, the available multiplier reservoir in the FPGA is freed up for other DSP functionalities (in ASIC realizations the area and power consumption would be reduced).

The optimal window is L=8 (in this case multiplications by 8 or by ⅛ become trivial word-shifts) however the HW itemization below is formulated in terms of a general L window size. Itemizing the required operations for the HW implementation of the averaging+disambiguation algorithm in an exemplary design (FIG. 2), we would require 3L comparators, L+1 adders, two OR gates, 2L+1 AND gates, a 2:1 MUX and a binary right-shifter (for the 8×multiplication). L−1 additional adders are required in the top row of L delay elements in FIG. 1. As for the multiplier-less CORDIC algorithm, all its operations (add-and-shift, comparators) may be shown to amount to complexity comparable with that of a single multiplier with the same word size. Finally, we propose to implement a slicer for arbitrary constellations, not just square QAM (e.g. ring constellations [11]) by means of a lookup table.

Simulated Performance of the Polar

Figure 3:
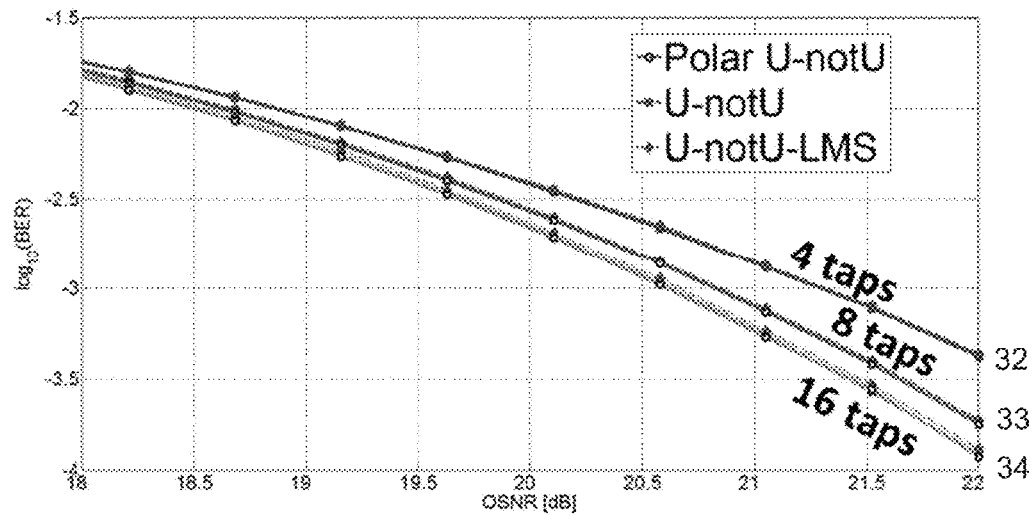
FIG. 3 illustrates simulated Polar-MSDD versus Cartesian-MSDD OSNR-BER performance averaging algorithm according to an embodiment of the invention.
Figure 3:
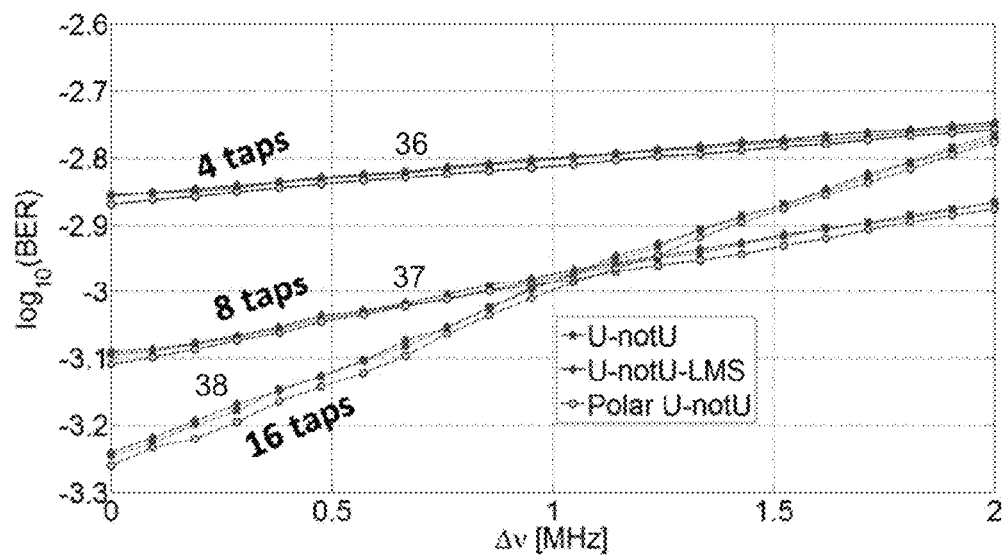

Simulated Polar-vs. Cartesian-MSDD OSNR-BER performance is shown in FIG. 3. Curves 32, 33 and 34 of graph 31 and curves 36, 37 and 38 of graph 35 refer to 4, 8 and 16 taps respectively and for three variants of the MSDD, two of which are the complex-valued U-notU and U-notU systems described at length in [2,3]. The third MSDD variant is the polar system described in this patent application. As the effective sampling rate of the parallelized MSDD is 25 GS/s (see the next section for the parallelization technique) the performance levels attained by the three variants (for a given L up to 16 taps) are indistinguishable from those of either the U-notU version (with fixed coefficients, 1/L), or its adaptive LMS version (wherein the coefficients are optimized). It is apparent in the simulation results of FIG. 3 that the three MSDD versions track up one another up to negligible <0.1 dB deviation, thus there is no penalty incurred upon adopting the lower complexity polar MSDD rather than its complex-valued U-notU predecessor [2]. However, notice that per [3] there is about a 0.2 dB penalty in using the U-notU rather than the more optimal notU-U version (our polar MSDD is based on the slightly sub-optimal U-notU flavor), and in turn the notU-U version falls behind the performance of the BPS CR by 0.2 dB at BER=10E-3. Thus, we estimate that at this BER the polar MSDD performance falls behind that of the benchmark BPS CR by about 0.4 dB, which is the price to pay for moving from a prohibitively complex BPS CR to the current ultra-low-complexity polar MSDD.

It turns out that other proposed two-staged CR variants, e.g. combining coarse BPS with maximum likelihood or alternative CR methods, also typically fall behind the BPS benchmark performance by 0.2-0.4 dB. It follows that the performance of our polar MSDD is in par with these previous MSDD variants, whereas our proposed multiplier-free scheme provides the lowest complexity.

II. Polyblock HW Parallelization of the MSDD CR

We now disclose a new block-processing oriented technique for temporal parallelization of CR HW processing, applicable in particular to differential detection decision-feedback driven CR schemes such as the MSDD. The proposed MSDD real-time HW parallelization method, referred to here as Polyblock Parallelization (PBP), enables realizing the CR DSP with slower clock for the FPGA or ASIC, while avoiding the conventional "distant-feedback" [2] phase-noise penalty due to parallelized processing. Such penalty is incurred in polyphase temporal parallelization of decision-feedback based schemes (such as the MSDD) upon time de-interleaving the samples and processing the M polyphases via M parallel MSDDs, each slowed down by a factor of M [12]. The M-fold reduction in sampling rate per polyphase degrades the linewidth tolerance of the CR by a factor of M. However, parallelizing the MSDD by means of the new polyblock method essentially eliminates the distant-feedback parallelization penalty.

FIG. 3: Comparative BER performance of several MSDD options. (top): BER vs. OSNR. (bottom) BER vs. linewidth (Tx+LO combined) at 21 dB OSNR. The "Polar U-nonU" algorithm, coded in the FPGA virtually coincides with the complex-valued MSDD. The figure indicates that under 1 MHz combined linewidth the optimal MSDD window size would be L=16, however the performance is only slightly degraded for L=8, which we adopted as it further slightly reduces complexity. Assumed parameters: baudrate=25 GBd, laser linewidth=100 KHz (for either Txg or LO lasers).

A. Polyblock MSDD with Initialization Overhead

A first variant of the novel parallelized hardware realization of the MSDD is described in FIG. 4(a) for the Tx 40 and in FIG. 4(b) for the receiver 50. The term "polyblock" is the essence of the concept: The sequential data stream is divided into consecutive blocks, P of them, with B samples per block. The blocks are processed in parallel by P MSDD processors operating at a rate P times slower than the sample rate of the original data stream. The initial element of each block is taken as a known training symbol (TS), say 1. The only consequence of using the known value of unity for the line symbol in this position is that precludes differentially decoding an s-data symbol for the position ahead of it, since the corresponding line sample is constrained to be unity rather than being allowed to equal the previous line sample times the s-symbol at this time. Thus, the overlapped polyblock scheme incurs a slight loss of spectral efficiency by a factor B−1/B. Evidently, the price to be paid by the polyblock scheme is the requirement to allocate memory buffers and some resulting latency. Actually this form of parallelization is well known to hardware designers, being widely used for implementing DSP generic functions in ASICs or FPGAs. Nevertheless, early works in carrier recovery (e.g. refs. [12]) in have not considered this form of parallelization, but rather assumed polyphase parallelization, which degraded by the so-called distant-feedback parallelization penalty [12]. Here we establish that it is polyblock rather than polyphase parallelization that is the preferred method for hardware parallelizing the MSDD DSP, treating the specific details and issues of the algorithm, evaluating its performance and establishing its improved laser linewidth tolerance. Finally, we introduce a polyblock MSDD variant which is capable of operating without initialization by training symbols, yet slightly improves the BER at the expense of a slight increase in complexity.

Figure 4:
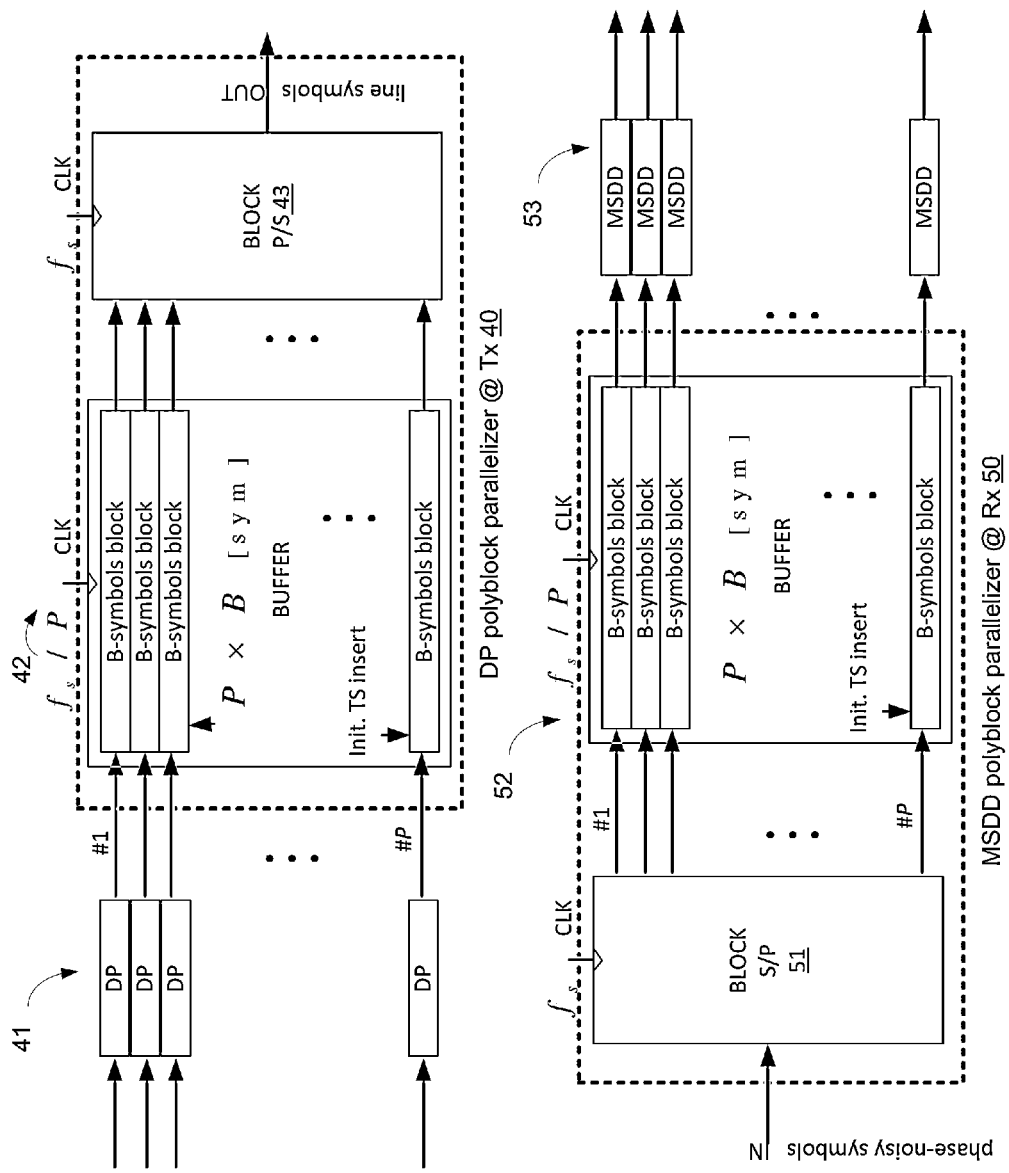
FIG. 4 illustrates parallelized hardware realization of the MSDD transmitter and receiver according to an embodiment of the invention.

FIG. 4 comprises a parallelized differential precoder (DP) 41 at the Tx and the corresponding parallelized MSDD 53 at the Rx. Key elements of this polyblock MSDD HW architecture are the Block Serial to Parallel (B_S/P) 51 and Block Parallel to Serial (B_P/S) converters 43, which are buffer arrays to write a serial data stream into and read from. The B_S/P writes sequential blocks of the incoming serial stream into memory buffers arrayed 52 vertically on top of each other. In the Rx (FIG. 4(b)) the top buffer (of buffers 42) is filled up by the incoming samples, next the buffer underneath is filled up, and so forth. Once the bottom buffer is filled up, the writing cycles back up to the top buffer which is overwritten with the new data (however the old data has already been processed by the MSDD). There are P parallel outputs of this array, each of which reads out the contents of each buffer but at a fraction 1/P of the input sampling rate, R. The system may also incorporate a dual memory array, whereby the data stored into the write-in array gets copied into a read-out array with identical buffers (not shown).

The degree of parallelization, P, is selected sufficiently large such that the MSDDs is implemented at a sampling rate R/P not exceeding the speed limitation of the HW platform. Each block, streaming out of a particular output port of the B_S/P, then represents a set of B contiguous samples of the original data stream (at the high rate), and can therefore be processed exactly as per FIG. 1. Thus, within each of these parallel modules, the processing proceeds in slowed-down discrete-time, exactly as specified by the "full-speed" MSDD algorithm. The only potential issue is the handling of the L initial points in each B-samples buffer, as both the DP and MSDD algorithms are causal recursive ones, and might require initialization and experience an initial transient. Addressing the block start-up issue is a critical aspect of the MSDD carrier recovery parallelization.

In the Tx (FIG. 4(a)), each of the DP modules is fed by one of the outputs of the B_S/P module and implements the DP recursion [3], $$A_k = s_k \check{A}_{k-1}, k=0,1,2,\ldots,B-1 \check{A}_{-1}=1 \quad (7)$$

Here k is the discrete-time index of the incoming stream of information samples $\{s_k\}$. It is just that the physical time associated with the discrete-time is slowed down by a factor of P in the parallelized realization, relative to an hypothetical full-speed direct implementation of (7), which is not attainable with current ASIC technology. The initialization $\check{A}_{-1}=1$ implies that $A_0=s_0$, next $A_1=s_1\check{A}_0=s_1\check{s}_0$, $A_2=s_2\check{A}_1=s_2\check{s}_1\check{s}_0$, amounting to a complex-valued multiplicative accumulator generating the line symbols out of the information symbols, which corresponds to an additive accumulator for the phase s:

$$A_k = s_k \Pi_{m=0}^{k-1} \check{s}_m \Rightarrow \angle A_k = \Sigma_{m=0}^{k} \angle \check{s}_m, k = 0,1,2,\ldots,B-1 \quad (8)$$

In the Rx (FIG. 4(b)), the Block MSDD (B_MSDD) implements either our previously introduced MSDD algorithm [2,3] or the new polar MSDD algorithm introduced above, albeit one block at a time, with special attention to the block initialization. The mathematical description below is carried out in terms of the complex-domain MSDD, but it may be readily cast in polar representation, by taking phase s:

$$\hat{s}_k = r_k \left[ \frac{1}{L} \sum_{i=1}^{L} R_{k-1}^{(i)} \right]^*; R_{k-1}^{(i)} \equiv r_{k-i} \prod_{m=1}^{i-1} \check{s}_{k-m}, \quad (9)$$

$$i = 1, 2, \ldots, L; k = 0, 1, 2, \ldots, B-1$$

$$R_{-1}^{(i)} = 1, i = 1, 2, \ldots, L$$

The sliding window processing of L prior samples implies some degradation in the quality of the first L−1 estimated symbols (to be input into the slicer) over the block head, as the k-th sample, with k<L is just preceded by L-k non-zero samples to average the phase noise over, rather than L samples. The initial L−1 recovered samples are explicitly expressed as follows:

$$\hat{s}_1 = r_1 \check{A}_0^*; \hat{s}_2 = r_2 \check{r}_1^*; \hat{s}_3 = r_2(\check{r}_1 + \check{r}_0 \check{s}_1)^* \quad (10)$$

$$\hat{s}_4 = r_4(\check{r}_3 + \check{r}_2\check{s}_3 + \check{r}_1\check{s}_2\check{s}_3 + \check{r}_0\check{s}_1\check{s}_2\check{s}_3)^*;$$

$$\vdots$$

$$\hat{s}_{L-1} = r_{L-1}(\check{r}_{L-2} + \check{r}_{L-3}\check{s}_{L-2} + \check{r}_{L-4}\check{s}_{L-3}\check{s}_{L-2} + \check{r}_0\check{s}_1 \ldots \check{s}_{L-2})^*$$

Notice that at time k=0 no data is conveyed as this is the initial symbol of the block, which does not have access to a phase reference ahead of it. It is only for k≥L that the block processor has access to a full window of L past symbols and may generate a "standard" MSDD estimate (or the corresponding polar-domain version of FIG. 1):

$$\hat{S} = r_k(\check{r}_{k-1} + \check{r}_{k-2}\check{s}_{k-1} + \check{r}_{k-3}\check{s}_{k-2}\check{s}_{k-1} + \check{r}_0\check{s}_1 \ldots \check{s}_{k-1})^* \quad (11)$$

The smaller k is (over the 1≤k<L initial interval), the more degraded its MSDD phase recovery is, due to insufficient white noise averaging over the shortened window. For example, the second recovered symbol, $\hat{S}=r_2\check{r}_1^*$, amounts to delay detection which has its white noise doubled. Fortunately, if the parallelization block size, B, is large enough, the higher error probability over the block head just slightly raises the average error probability over the overall block (as it is not that all symbols in the block incur uniformly higher error probability, but just the first L symbols in the block do—the average error probability is then slightly higher, with the errors slightly more likely to occur in the head of the block than elsewhere in the block). It is possible to further trade off this slightly higher error probability vs. a slight increase in computational load, by introducing an overlapped block strategy as described in the next subsection.

B. Initialization-Free, Block-Overlapped Polyblock MSDD

In the initial variant of the MSDD polyblock parallelization scheme as discussed above, the error rate is enhanced for the first L samples of each block, during the interval that the MSDD (as initialized by the training sample set to 1 starting each block), converges to steady-state performance.

We now introduce an alternative overlapped polyblock parallelization scheme (FIG. 5) increasing the block size from B to B+$L_{Train}$, while having adjacent extended blocks overlap by $L_{Overlap}$ samples. Compared with the first polyblock scheme introduced in the last sub-section, this scheme avoids enhancement in error rate over the first L samples of each block. Remarkably, for the MSDD this scheme operates without initialization altogether (i.e., we may set $L_{Train}$=0), although for generality we maintained the training interval, $L_{Train}$, in FIG. 5, as might be required for non-MSDD CR.

In this overlapped scheme the block-parallel/serial module still partitions the incoming fast rate samples into successive blocks of B samples arrayed into a 2D buffer of P rows of B samples each. However, ahead of this buffer an additional buffer of P rows of $L_{Overlap}$ samples each is prepended as indicated in the figure, forming a (B+$L_{Overlap}$)×p buffer array. The B samples in each row of the B×P sub-array are written into by the B_P/S, whereas the prepended array is handled as follows: as soon as the B incoming samples are stored in the p-th row, then the last $L_{Overlap}$ samples out of these B samples are copied over (at the reduced rate of R/P, where R is the fast line rate) into the initial $L_{Overlap}$ samples of the p+1-th row (this occurs in parallel with the fast data being deposited into the B samples of the p+1-th row). Notice that the copy introduces an extra latency by a factor of (B+$L_{Overlap}$)/B=1+$L_{Overlap}$/B.

We may characterize the overlapped writing into (B+$L_{Overlap}$)×P buffer array as consisting of writing into the B×P sub-array and prepending an overlap-prefix of $L_{Overlap}$ samples to each B-block, obtained by replicating ahead of the current B-block the last $L_{Overlap}$ samples of the previous B-block.

Given the duplication of the samples, the processing of these particular $L_{Overlap}$ samples may in principle be performed either in the tail of the p-th block or in the appended head of the p+1-th block. It is advantageous to adopt the last mentioned option, since in this case the MSDD sliding window associated for each sample in the L samples tail of each block may now extend L symbols into the past. Thus, the MSDD exercises its normal operation over the last B samples of the p-th block, including the very last L samples. MSDD operation is oblivious to the L-th sample from the end actually being a 1 training symbol.

Figure 8:
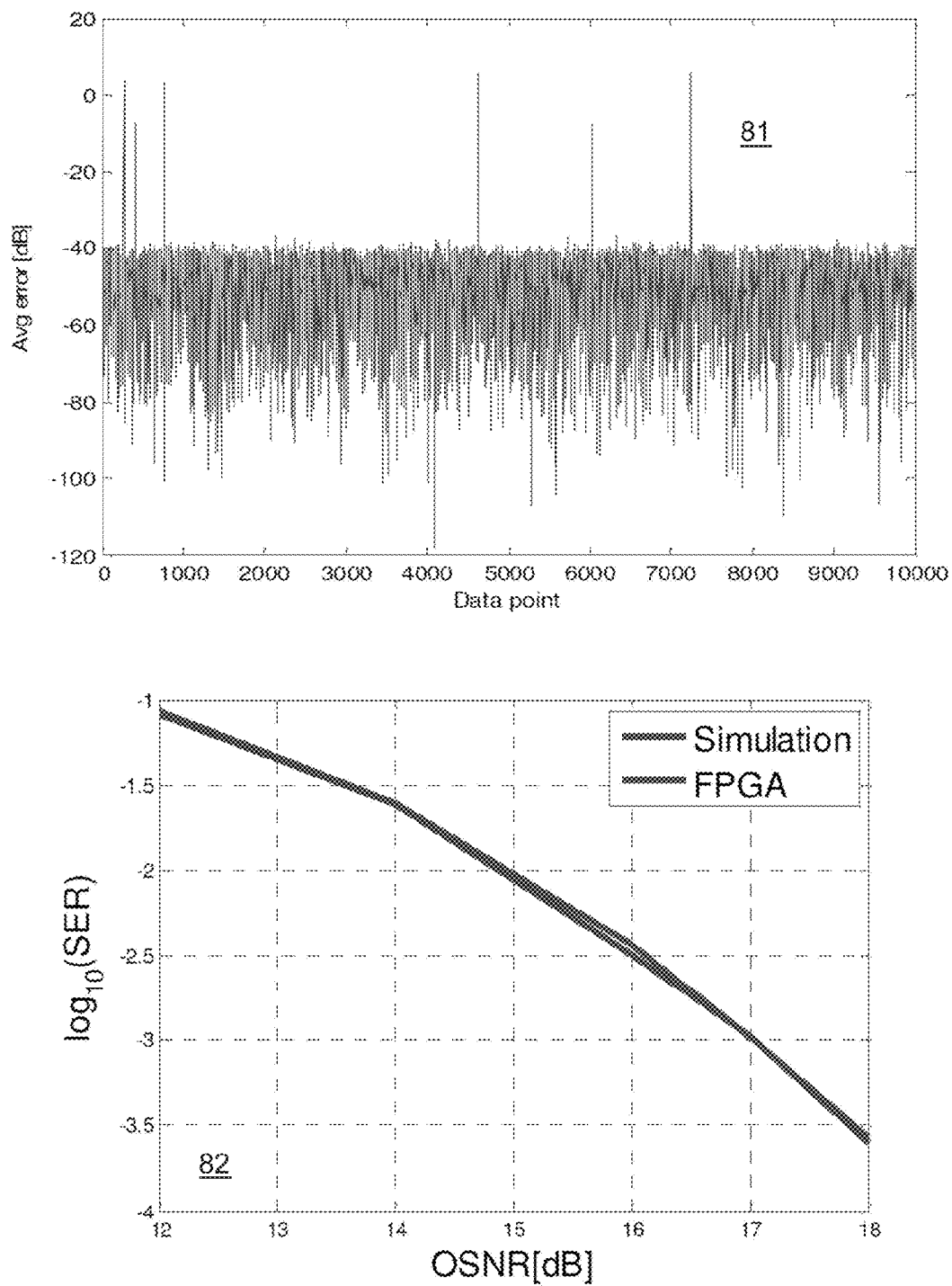
FIG. 8 illustrates numerical errors between FPGA fixed point implementation and exact calculations and illustrates SET versus OSNR measured on FPGA setup for QPSK transmission according to an embodiment of the invention.

We explored the possibility of starting the MSDD without any training sequence (which would be desirable as there would be no need for synchronization of the MSDD with respect to the timing phase of the TS). Indeed, as borne out by simulation, as shown in FIG. 8, it is possible to "cold-start" the MSDD and have it "warm-up" for a number of symbols (8 or more) such that the error propagation fades out after the initial warm-up interval. Thus, the TS may be degenerated to zero, we just partition the incoming data into blocks and overlap them by at least $L_{Overlap}$=8 samples, running a separate slow MSDD algorithm for each block, which converges almost perfectly to its "steady-state BER" within the overlap interval We may characterize the overlapped writing into (B+$L_{Overlap}$)×P buffer array as consisting of writing into the B×P sub-array and prepending an overlap-prefix of $L_{Overlap}$ samples to each B-block, obtained by replicating ahead of the current B-block the last $L_{Overlap}$ samples of the previous B-block.

Given the duplication of the samples, the processing of these particular $L_{Overlap}$ samples may in principle be performed either in the tail of the p-th block or in the appended head of the p+1-th block. It is advantageous to adopt the last mentioned option, since in this case the MSDD sliding window associated for each sample in the L samples tail of each block may now extend L symbols into the past. Thus, the MSDD exercises its normal operation over the last B samples of the p-th block, including the very last L samples. MSDD operation is oblivious to the L-th sample from the end actually being a 1 training symbol.

We explored the possibility of starting the MSDD without any training sequence (which would be desirable as there would be no need for synchronization of the MSDD with respect to the timing phase of the TS). Indeed, as borne out by simulation, as shown in FIG. 8, it is possible to "cold-start" the MSDD and have it "warm-up" for a number of symbols (8 or more) such that the error propagation fades out after the initial warm-up interval. Thus, the TS may be degenerated to zero, we just partition the incoming data into blocks and overlap them by at least $L_{Overlap}$=8 samples, running a separate slow MSDD algorithm for each block, which converges almost perfectly to its "steady-state BER" within the overlap interval.

Figure 5:
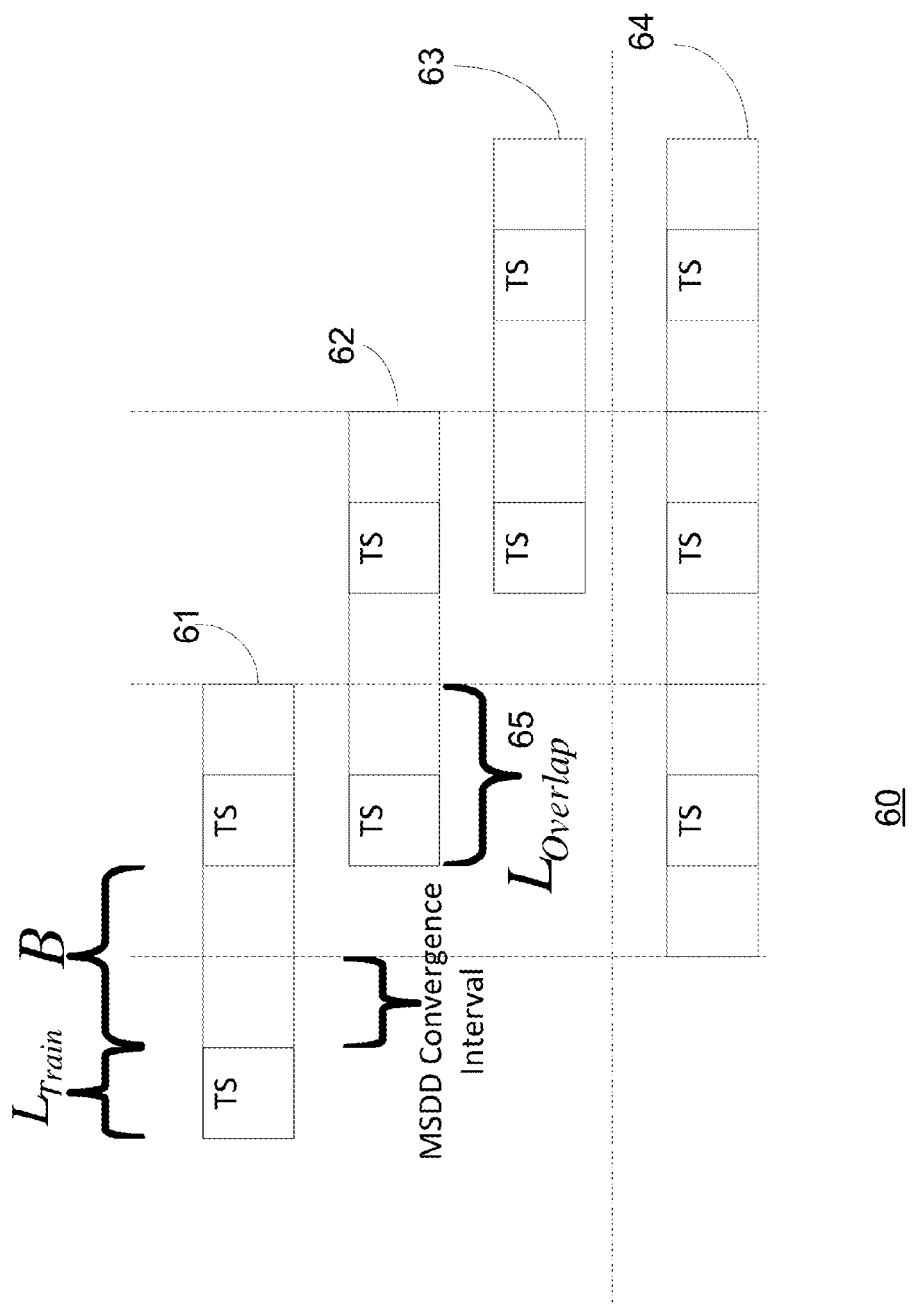
FIG. 5 illustrates block-overlapped polyblock MSDD parallelization according to an embodiment of the invention.

FIG. 5 illustrates block-overlapped polyblock MSDD parallelization and shows (B+L)×P buffer array structure 61, 62 and 63 and writing into the buffer array (writing order 64). The B×P sub-array is fed by the block-serial-parallel converter, in effect sequentially writing the incoming samples into the B elements of the successive rows of the B×P sub-array. The first L elements of each row are copied over from the last L elements of the previous row, as indicated by the arrow marked "copy". P MSDDs operate in parallel over the last B elements of the P rows. Notice that the leftmost element within the last L elements of each row is always a 1 training symbol, thus due to the copy operation the first column of the (B+L)×P array is all ones, and so is the B-th column of (B+L)×P array (which coincides with the (B−L)-th column of the B×P sub-array). In our parallelized MSDD we have found that we may set up the TS duration, $L_{Train}$=0, running the MSDD parallelized modules without initialization in a "self-starting" mode, such that $L_{Overlap}$ just comprises an MSDD convergence interval of L=8 samples C. HW Complexity Considerations Notice that the processing must be run at a slightly enhanced rate: Now B+L samples must be processed during the time it takes to deposit B samples into the memory. Thus, the overlapped scheme must operate at a clock-rate elevated by a factor of (B+L)/B=1+L/B, increasing the computational complexity (ops per unit time) by this factor. However, as typically L B, the extra computational load and latency are relatively small The second discernible cost of using PBP is the allocation of a 1.38 Mbyte buffer in our FPGA and some parallel-serial block data shuffling. In detail, the PBP incremental hardware cost is the inclusion of a two-dimensional block-parallel buffer of size P×B, with P the number of parallel paths and B the block size, which incurs a fractional transmission overhead 1/B (due to the initial symbol which is not useful for transmission). E.g., upon selecting a sufficiently large block size of B=4 Ksamp, a spectral efficiency loss of just 1/B=0.02% is incurred. In our FPGA realization, the GHz channel baud-rate is 25 GS/s, 64 times faster than our FPGA processing clock of 4110 MHz. As the HW takes 5 clock cycles to complete one iteration of the MSDD loop, we then require a temporal parallelization factor of P=64 5=320. The buffer storage for PBP realization, expressed in bits, is then relatively modest (we use 8 bits words, i.e., one byte per phase sample):

$$P \times B = 320 \times 4\text{Ksamp} = 1.28\text{Msamp} \rightarrow 1.28\text{Msamp} \cdot 1 \text{ byte/samp} = 1.28 \text{ Mbyte} \quad (10)$$

Figure 6:
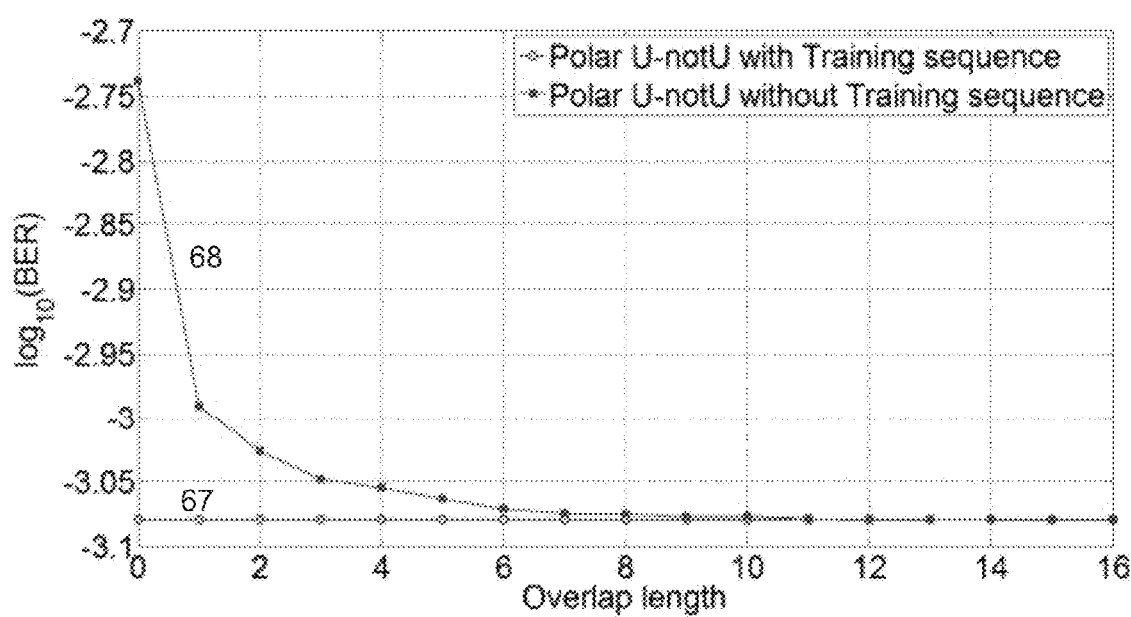
FIG. 6 illustrates illustrate the impact of using vs. not using training sequence according to an embodiment of the invention.

FIG. 6 includes graph 69 that include two curves 67 and 68 that illustrate the impact of using vs. not using training sequence on the BER vs. the "overlap length" namely the sample number from which we start monitoring the BER. It is apparent that overlapping by as little as L=8 samples suffices to provide nearly negligible penalty due to lack of training sequence initialization. The assumed system parameters are as in FIG. 3.

We should mention that the PBP technique presented here is somewhat similar to the superscalar parallelization used in other CR methods [13], however the PBP is specifically adapted to the current MSDD context.

FPGA Implementation and Real-Time Demo

We actually tested the hardware implementation of the new polar MSDD in FPGA and established its real-time HW operation by having the new MSDD embedded in an optical transmission chain using a single-carrier (SC) QPSK SC differentially encoded signal, occupying a total channel bandwidth of 25 GHz. Notice that it is just the MSDD CR that is demonstrated here in real-time HW; apart from the MSDD FPGA, the rest of the transmission chain (SC transmitter (Tx), fiber channel, receiver (Rx) front-end and DSP) is simulated offline, feeding symbols into the MSDD FPGA memory and reading decisions off the MSDD output memory. However, in between its input and output memory, the MSDD FPGA is demonstrated in real-time at full 25 GBd rate (parallelized over 320 paths).

The following design was implemented using Xilinx Virtex XC6VLX240T FPGA. The FPGA block diagram is shown in FIG. 9a. In FIG. 9b we present the resources required for the implementation for a given FPGA. Much larger FPGA chips from Virtex 6 and 7 families are already available, which may significantly lower the quoted utilization figure s. FIG. 8 presents the numerical results received after the implementation. The deviation between fixed FPGA and floating point calculations is −40 dB except for a few isolated errors.

The real-time FPGA_CR+offline_optical_link demo described here verifies the new MSDD as a suitable integrative CR HW solution, simplifying DSP ASIC design. The proposed carrier recovery algorithm is both hardware efficient and its performance is relatively high.

Figure 7:
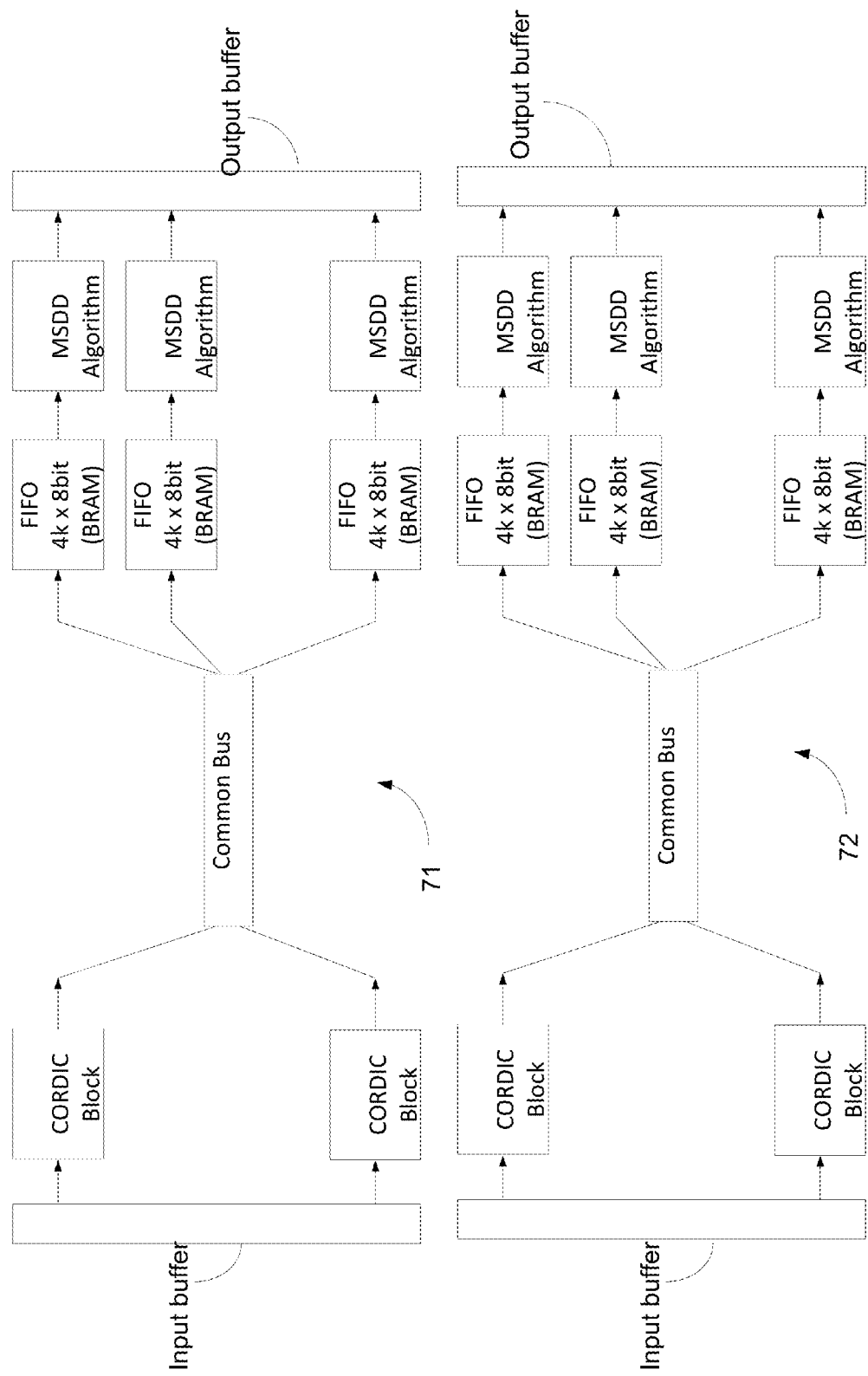
FIG. 7 illustrates FPGAs according to various embodiment of the invention.

FIG. 7 illustrate FPGAs 71 and 72 according to various embodiment of the invention. The following table illustrates resource allocation of FPGAs according to various embodiment of the invention.

| Module | Slice Registers/ Utilization | Slice LUTs/ Utilization | BRAM bocks/ Utilization |
|---|---|---|---|
| MSDD algorithm | 411/0.14% | 275/0.1825% | 0/0% |
| Memory block | 0/0% | 0/0% | 1/0.2398% |
| Single Processing Branch | 411/0.14% | 275/0.1825% | 1/0.2398% |
| 320 Branches | 131520/43% | 88000/58% | 320/76% |

Alternative "pre-delta" embodiment of the Polar MSDD (phase-recovery-only version) and its tolerance to carrier frequency offset (CFO).

We now introduce an alternative equivalent embodiment of the polar MSDD as described in FIG. 9 Compared to FIG. 1 this embodiment of the polar MSDD the order of phase-averaging and subtraction are reversed, performing subtractions (digital derivative) first, then averaging. Thus, this version will be referred to as pre-delta (delta being here the digital derivatives), whereas the version of FIG. 1 is henceforth referred to as post-delta, as there a difference $\underline{r}_k - \angle \underline{R}_{k-1}$ is generated after the phase averaging, as opposed to the current pre-delta version of FIG. 9 wherein the differences $\underline{r}_k - \angle \underline{r}_{k-i}$ are generated prior to phase average.

FIG. 8 includes graph 81 that illustrates a numerical error between FPGA fixed point implementation and exact calculation and graph 82 that illustrates SER vs OSNR measured on FPGA setup for QPSK transmission, according to an embodiment of the invention.

FIG. 9 illustrates an MSDD carrier recovery system 90 of the pre-delta type compensating for phase-noise according to an embodiment of the invention.

In this section we shall determine the inherent tolerance to Carrier Frequency Offset (CFO) of the MSDD systems of FIGS. 1 and 9 which are not purposely designed to mitigate CFO but are nominally intended to mitigate phase noise.

In coherent detection homodyne systems, be they optical or wireless, the CFO indicates an undesired difference between transmitter and receiver local oscillator frequencies. We model the impact of CFO as multiplication of the sequence of samples (indexed by discrete-time k) by the phase factor $\exp\{jk\theta\}$ where $$\theta = 2\pi \Delta v_{CFO} T_s = 2\pi \Delta v_{CFO} R_s^{-1} \quad (12)$$

is the CFO-induced phase increment per sample, $\Delta v_{CFO}$ is the CFO in Hz units and $T_s$ is the sampling interval and $R_s = T_s^{-1}$ is the sampling rate (equal here to the baudrate).

Subsequently we introduce enhancements to the phase compensation MSDD schemes of FIGS. 1 and 9 in order to also mitigate CFO, in addition to phase noise.

Let us briefly analyze system operation of the polar MSDD variant of FIG. 9. Assume that the noisy symbols $\underline{r}_k$ input into the MSDD from the previous receiver stages are modeled as phase-noisy versions of the transmitted line symbols, $$\underline{r}_k = \underline{A}_k + \underline{n}_k = |1 + Re\{\underline{n}_k\}/|\underline{A}_k||\underline{A}_k e^{j\phi_k} \Rightarrow \angle \underline{r}_k = \angle \underline{A}_k + \phi_k. \quad (13)$$

The AWG-induced phase noise is modeled as a Gaussian noise random process $\eta_k = \text{Im}\{\underline{n}_k\}/|\underline{A}_k|$, $N[0, \sigma_{ASE}^2]$, where $\underline{r}_k = \underline{A}_k + \underline{n}_k$ and $\underline{n}_k$ is the additive white zero-mean circular Gaussian (AWZMCG) noise affecting the transmitted symbols $\underline{A}_k$ and re/im denotes taking the real/imaginary part, The phase noise and distortion, $\phi_k$, comprises an Additive White Noise (AWG) component $\eta_k$ (in optical transmission this is due such as Amplified Spontaneous Emission (ASE)) and random-walk phase noise (in optical transmission this is due to Laser Phase Noise (LPN)). The random-walk phase noise is modeled as a Weiner-Levy random walk process generated by accumulating zero-mean Gaussian increments $\Omega_k$ of variance $$\sigma_{LPN}^2 = \langle \Omega_k^2 \rangle = 2\pi \Delta v_{LW} R_s^{-1}, \quad (14)$$

where $\Delta v_{LW}$ is the laser linewidth.

Notice that in addition to the random phase walk by $\Omega_k$ steps, there is also a systematic phase walk-off, adding in each step a constant phase increment, θ, due to CFO (Eq. (12)), yielding the CFO-induced "ramp", kθ in the phase sequence $\phi_k$, which is now described by the overall expression $$\phi_k = \eta_k + step_k \otimes (\Omega_m + \theta) = \eta_k + \phi_k + k\theta; \phi_k = \sum_{m=k_{init}}^{k} \Omega_m + \phi_{k_{init}} \angle r_k = \angle A_k + \eta_k + \phi_k + k\theta \quad (15)$$

where $step_k$ is a step sequence (equal 1 for non-negative k, zero otherwise) describing the accumulator impulse response (IR) and ⊗ denotes convolution.

The outputs $\angle\hat{S}_k^{(i)}$, i=1, 2, ... L of the top row of subtractors in FIG. 9, are referred to as partial estimators, as averaging over them yields our final phase estimate $\angle\hat{S}_k$, which is input into the slicer (decision device). The partial estimators are then evaluated (using (15) and (2)):

$$\angle\hat{S}_k^{(1)} = \angle r_k - \angle r_{k-1} \quad (16)$$
$$= (\angle A_k + \eta_k + \phi_k + k\theta) - (\angle A_{k-1} + \eta_{k-1} + \phi_{k-1} + (k-1)\theta)$$
$$= \angle A_k - \angle A_{k-1} + \eta_k - \eta_{k-1} + \phi_k - \phi_{k-1} + \theta$$
$$= \angle S_k + \eta_k - \eta_{k-1} + \Omega_k + \theta$$

$$\angle\hat{S}_k^{(2)} = \angle r_k - \angle r_{k-2} \quad (17)$$
$$= (\angle A_k + \eta_k + \phi_k + k\theta) - (\angle A_{k-2} + \angle S_{k-1} + \eta_{k-2} + \phi_{k-2} + (k-2)\theta)$$
$$= \angle A_k - (\angle A_{k-2} + \angle S_{k-1}) + \eta_k - \eta_{k-2} + \phi_k - \phi_{k-2} + 2\theta$$
$$= \angle S_k + (\eta_k - \eta_{k-1}) + (\Omega_k + \Omega_{k-1}) + 2\theta$$

$$\angle\hat{S}_k^{(i)} = \angle r_k - \angle r_{k-i} \quad (18)$$
$$= (\angle A_k + \eta_k + \phi_k + k\theta) - \begin{pmatrix} \angle A_{k-i} + \angle S_{k-i+1} + ... \angle S_{k-1} + \\ \eta_{k-i} + \phi_{k-i} + (k-i)\theta \end{pmatrix}$$
$$= \angle A_k - (\angle A_{k-i} + \angle S_{k-i+1} + ... \angle S_{k-1}) + \eta_k - \eta_{k-i} + \phi_k - \phi_{k-i} + i\theta$$
$$= \angle S_k + (\eta_k - \eta_{k-i}) + (\Omega_k + \Omega_{k-1} + ... \Omega_{k-i+1}) + i\theta$$

where the differential precoding relations (1) and (2) were used.

Thus, in the absence of noise and CFO, all partial estimators $\angle\hat{S}_k^{(i)}$ ideally end up equal the transmitted info symbol, $\angle S_k$. The white ASE noise yields $\eta_k - \eta_{k-i}$ whereas the cumulative LPN successively degrades the noise, yielding a degradation $\sum_{m=k-i+1}^{k} \Omega_m$. The CFO effect is to generate an offset iθ in the i-th partial estimator. Upon subsequently averaging over all L partial estimators (to extract a quitter version of $\angle S_k$) these offsets will yield a constant phase offset (a rotation of the constellation) at the slicer input, to be referred to as "CFO phase rotation".

Ignoring phase disambiguation for the moment (i.e. pretending all phases are unwrapped phases not confined to a 2π interval), the phase averaging operation over the partial estimators, then yields:

$$\angle\hat{S}_k = \frac{1}{L}\sum_{i=1}^{L} \angle\hat{S}_k^{(i)} \quad (19)$$
$$= \frac{1}{L}\sum_{i=1}^{L} [\angle S_k + (\eta_k - \eta_{k-i}) + (\Omega_k + \Omega_{k-1} + ... \Omega_{k-i+1}) + i\theta]$$
$$= \angle S_k + \eta_k - \frac{1}{L}\sum_{i=1}^{L} \eta_{k-i} + \phi_k^{LPN} + \frac{L+1}{2}\theta;$$

where the laser phase noise contribution is given by $$\phi_k^{LPN} \equiv \phi_k - \frac{1}{L}\sum_{i=1}^{L} \phi_{k-i} = \frac{1}{L}\sum_{i=1}^{L}(\phi_k - \phi_{k-i}) = \frac{1}{L}\sum_{i=1}^{L}\sum_{m=k-i+i}^{k} \Omega_m \quad (20)$$

The phase averaging is then seen to reduce the variance of the white noise terms $\{\eta_{k-i}\}$ by a factor of L (but does not improve $\eta_k$, which would be the ultimate white noise present in an ideal phase-noise-free local oscillator). The phase noise term $\phi_{LPN}$ represents the degradation of the MSDD phase estimate due to the LPN, which increases with block length, L (however, for moderate L, such as L=8 in our exemplary system, the LPN degradation is kept relatively small, vs. the larger benefit of ASE noise reduction due to averaging).

The effect of the CFO is then to generate in $\angle\hat{S}_k$ at the slicer input a fixed CFO-induced phase rotation:

$$\psi_{rot}^{CFO} = \frac{L+1}{2}\theta = (L+1)\pi\Delta v_{CFO} R_s^{-1} \quad (21)$$

The slicer performance is degraded whenever this phase rotation becomes excessive. Let us assess the CFO impairment of the polar MSDD CR sub-system. E.g., for an L=8 averaging window, to bound the CFO impairment to 10 mrad of constellation rotation would require to restrict the CFO to $$|\Delta v_{CFO}^{max}| = \frac{|\psi_{rot}^{CFO}|}{(L+1)\pi} R_s \quad (2)$$
$$= \frac{10 \cdot 10^{-3}}{(8+1)\pi} R_s$$
$$= 3.5 \cdot 10^{-2} R_s.$$

For $R_s$=25 GBd symbol (and sampling) rate, this would yield a maximum CFO tolerance of $|\Delta v_{CFO}^{max}|$=8.8 MHz We next carry out a similar analysis for the alternative equivalent polar MSDD system depicted in FIG. 1. The inputs into the phase averaging module (referred to as partial references) are denoted $\angle R_{k-1}^{(i)}$. These signals are analyzed into the following signal and noise contributions:

$\angle R_{k-1}^{(1)} = \angle r_{k-1} + \angle A_{k-1}\eta_{k-1} + \phi_{k-1} + (k-1)\theta$ $\angle R_{k-1}^{(2)} = \angle r_{k-2} + \angle \check{s}_{k-1} = \angle A_{k-2}\eta_{k-2} + \phi_{k-2} + (k-2)\theta +$
$\angle \check{s}_{k-1} = \angle A_{k-1} + \eta_{k-2} - 2\theta + k\theta$ $\angle R_{k-1}^{(i)} = \angle r_{k-i} + \angle \check{s}_{k-i+1} + \angle \check{s}_{k-i+2} + ... + \angle \check{s}_{k-1} =$
$\angle A_{k-i} + \angle \check{s}_{k-i+1} + \angle \check{s}_{k-i+2} + ... +$
$\angle \check{s}_{k-1} + \eta_{k-i} + \phi_{k-i} + (k-i)\theta =$
$\angle A_{k-1} + \eta_{k-i} + \phi_{k-i} - i\theta + k\theta$ (23)

where again the differential precoding relations (1) and (2) were used, and we also assumed that the slicer made no error, i.e.:

$$\angle \hat{s}_{k-i+1} + \angle \hat{s}_{k-i+2} + \ldots + \angle \hat{s}_{k-1} = \angle s_{k-i+1} + s_{k-i+2} + \ldots + \angle s_{k-1} \quad (24)$$

It is apparent that all the partial references ideally equal $\angle A_{k-1}$ in the absence of noise and CFO. In the presence of noise the common phase $\angle A_{k-1}$ is corrupted by noise fluctuations, the uncorrelated (white noise) components of which are further suppressed by averaging of all L partial references, yielding an improved reference, $\angle R_{k-1}$.

Here, in addition to fixed phase rotations, $i\theta$, all partial references contain a phase ramp, $k\theta$. Notice that this phase ramp was cancelled out in the analysis of FIG. 1, due to "pre-delta" operations (subtractions) involving the $\angle r_k$ signal. However, here in post-delta variant of the MSDD, the $k\theta$ ramp cancellation is deferred to the "post-delta" operation following the averaging.

Ignoring phase disambiguation for the moment, the phase averaging operation over the partial references then yields:

$$\angle R_{k-1} = \frac{1}{L}\sum_{i=1}^{L} \angle R_{k-1}^{(i)} \quad (25)$$

$$= \frac{1}{L}\sum_{i=1}^{L}[\angle A_{k-1} + \eta_{k-i} + \phi_{k-i} - i\theta + k\theta]$$

$$= \angle A_{k-1} + \frac{1}{L}\sum_{i=1}^{L}\eta_{k-i} + \frac{1}{L}\sum_{i=1}^{L}\phi_{k-i} - \frac{L+1}{2}\theta + k\theta$$

Thus, the phase averager output, $\angle R_{k-1}$, referred to as improved reference, is essentially the prior line symbol phase, $\angle A_{k-1}$ (which may be used as reference for differential detection), degraded by an average of the white noise samples (with its variance suppressed by a factor of L due to the averaging effect), by the average phase noise, by a fixed phase rotation $$-\frac{L+1}{2}\theta$$

and further containing a phase ramp, $k\theta$. This improved reference phase is subtracted off the phase of the k-th sample, yielding the following estimator at the slicer input:

$$\angle \hat{s}_k = \angle r_k - \angle R_{k-1} \quad (26)$$

$$= (\angle A_k + \eta_k + \phi_k + k\theta) - \left(\angle A_{k-1} + \frac{1}{L}\sum_{i=1}^{L}\eta_{k-i} + \frac{1}{L}\sum_{i=1}^{L}\phi_{k-i} - \frac{L+1}{2}\theta + k\theta\right)$$

$$= \angle S_k + \eta_k - \frac{1}{L}\sum_{i=1}^{L}\eta_{k-i} + \phi_k^{LPN} + \frac{L+1}{2}\theta$$

which reconstructs the same result as in Eq. (19). Notice in particular that the two phase ramps, $k\theta$, in the two terms $r_k$, $\angle R_{k-1}$ have cancelled out leaving just a constant phase rotation, $$\frac{L+1}{2}\theta,$$

as induced by the CFO, which also appeared in the analysis of FIG. 9. The equivalence between the two systems of FIGS. 1 and 9 (Eqs. (19) and (26)) is alternatively made evident by noting that taking an average over $\angle r_k$ minus various inputs (FIG. 9) amounts to $\angle r_k$ minus an average of the various inputs (FIG. 1). One may wonder what the advantage of the embodiment of FIG. 9 over that of FIG. 1, as in FIG. 2 we use L subtractors in the pre-delta operations, whereas in FIG. 1 we use one subtractor in the post-delta operation. In the next section we extend the MSDD to cancel out the constant CFO-induced phase rotation, with little extra degradation, showing that the two schemes of FIGS. 1 and 9 (which mitigate just phase noise) lead to different embodiments, with different properties for CFO mitigation, More General Phase Averaging with Non-Uniform Taps for Improved Phase Noise Mitigation More general embodiments of the two polar MSDD variants of FIGS. 1 and 9 consist of replacing the simple arithmetic average by weighted averages with unequal (non-uniform) taps summing up to unity. This has the advantage of potentially reducing the total phase noise by making the moving average operation better approximate an optimal Wiener filter. Such a Wiener filter was discussed in [2,3] but not in the phase domain but rather in the complex domain. The current disclosure extends it to a low-complexity implementation in the phase domain In the current phase domain context, for a phase-domain MSDD, using unequal weights (taps) in the moving average enables to better approximate the Wiener filter (hence slightly improve performance). However, the tradeoff of using general taps (rather than having all taps be uniformly equal to 1/L) is that additional complex multipliers (multipliers of a variable by a constant) are required (which may be implemented by shifts and adds). It may be possible to select simple tap values, such as n/8 where n=0,1,2, . . . ,8 such that the implementation of the complex multipliers remains relatively simple, yet slightly improve performance. MSDD schemes based on non-uniform averaging taps will be shown in the sequel (also equipped to mitigate CFO), however by removing the CFO mitigation sub-systems, these schemes may be downgraded to phase-noise-mitigating-only MSDDs with non-uniform taps, hence slightly improved phase noise tolerance.

4. Polar MSDD Extended to Also Mitigate Carrier Frequency Offset

The polar-MSDD (FIG. 20) is augmented by a new CFO EST module, adding frequency recovery capability to the rest of the system, which is designed to mitigate phase noise. Briefly reviewing the principle, each of the L signed adders in the second row under the top implement f-lag differences of current and prior phases, for i=1,2, . . . ,L=8. Aided by decision feedback, each of these diverse delay detectors would ideally reconstruct (in the noiseless, CFO-free case) the differentially precoded signal $s_k$, however in the presence of phase noises they exhibit diversity in the sense that the white ASE noise components in their phase fluctuations are uncorrelated, thus may be averaged out, yielding an improved phase estimate.

CFO EST new principle: In the presence of CFO, $\angle \underline{r}_k = \theta k$, $\angle \underline{r}_k - \angle \underline{r}_{k-i} = \theta i$.

CFO then manifests as a phase ramp $\theta, 2\theta, 3\theta, \ldots, L\theta$ at successive i-lag differential detectors outputs (outputs of the Phase Unwrap module in FIG. 1). Averaging over the arithmetic sequence ($\tau$ and $$\frac{1}{L}$$

operations after phase unwrap) yields a phase offset $$\theta + 2\theta + \ldots + L\theta = \frac{L+1}{2}\theta = 4.5\theta.$$

The precise same phase must be estimated by CFO EST and cancelled out in the subtractor before the slicer. The challenge is to perform the CFO estimation while leaking in little excess noise and not being affected by the common phase riding on the differential detector outputs. To this end, the CFO EST uses a novel L-taps MISO filter design, with taps given by +++ ... --- (where ±indicates ±1), with zero DC gain, yet with inherent noise averaging.

For L=8, the MISO filter output is given by $(5\theta+6\theta+7\theta+8\theta)-(\theta+2\theta+3\theta+4\theta)=16\theta$, (it features both a derivative and averages) while for general L, it is $g\theta$, with $g=L^2/4=16$. The MISO filter output is smoothed out through an additional $L_{MA}$-point moving average (here $L_a=128$) which retains its DC value, then is scaled out by $$g^{-1}\left(\frac{L+1}{2}\right) = 2(L^{-1} + L^{-2}) = 2^{-2} + 2^{-5}$$

(this factor is simply implemented by a single adder and two trivial bit-shifts), yielding the sought estimate $$g\theta \cdot g^{-1}\frac{L+1}{2} = \frac{L+1}{2}\theta = 4.5\theta$$

of the CFO induced phase offset, which precisely cancels out the CFO induced fixed angular offset $4.5\theta$, which is generated by the "regular" MSDD section, mitigating phase noise.

Having explained the functionality of the new CFO EST module, let us briefly review MSDD operation for phase estimation (assuming phase noise but zero CFO) for the benefit of readers who have not consulted prior MSDD papers. In the absence of noise, due to differential precoding (DP) we would have, $\angle \underline{r}_k - \angle \underline{r}_{k-1} = \angle \underline{s}_k$ retrieving the data angle into the transmitter DP. The other differential detectors generate $\angle \underline{r}_k - \angle \underline{r}_{k-2} = \angle \underline{s}_k + \angle \underline{s}_{k-1}$. but those are corrected by sums of prior angular decisions such that after the additive corrections all L=8 differential precoders (outputs of the phase unwrap module) would have a common phase equal to $\angle \underline{r}_k - \angle \underline{r}_{k-1} = \angle \underline{s}_k$.

When phase noise of any source is present, the L common phase terms are perturbed by phase noises. The ASE components are independent and may be averaged out by the $\Sigma$ and $$\frac{1}{L}$$

operations after phase unwrap, generating an improved $\angle \underline{s}_k$, estimate fed into the slicer. The laser phase noises in the L averaged phases are actually correlated and degrade the quality of the estimate to the extent the window L is excessively increased, but as the simulation in the next section indicates, for L=8, a beneficial tradeoff between ASE improvement and laser phase noise degradation.

As indicated above we now extend the Polar MSDD such that it also compensate for carrier frequency offset (CFO) in addition to phase noise. We disclose two families of embodiments obtained by enhancing the block diagrams of FIG. 9 with innovative CFO Estimation and Compensation (E&C) modules. Before presenting the most general embodiments for the two respective families let us start from two specific embodiments which will exemplify the principles.

Using FIG. 9 as a starting point, we insert into that figure a linear time-varying filtering module denoted as "CFO E&C", yielding FIG. 8. Here the CFO E&C new module is inserted in between the phase averaging and disambiguation output and the slicer phase input.

FIG. 8 illustrates an MSDD carrier recovery system of the post-delta type compensating for phase-noise and CFO.

In the embodiment of FIG. 10 the "CFO E&C" is realized by splitting the signal into the "CFO E&C" module into a through path and a moving average path, subtracting the output of the moving average from the through path in order to yield the output of the "CFO E&C" module. The moving average output provides an estimate of the constant CFO phase rotation, which is cancelled out by subtracting it from the through path.

One particular possible moving average embodiment is shown in the figure (with $L_a$ equal taps each equal $L_a^{-1}$, realized by the cascade of a "skip-$L_a$" discrete-time differentiator, $y_k = x_k - x_{k-L_a}$ followed by an accumulator, $z_k = z_{k-1} + y_k$), however more general moving average realizations are possible (with unequal either finite or infinite number of taps) The only requirement on the moving average taps being that they sum up to unity, i.e., equivalently, the DC gain of the moving average is unity. Notice the through pass also has unity gain and we subtract two subsystems in parallel (the through pass and the moving average) then the net gain of the CFO E&C with respect to noise is 1−1=0. A rough sense why this is useful is to note that there is a constant (DC) term $$\frac{L+1}{2}\theta$$

in the input to the CFO E&C, thus zero DC gain is useful at it cancels out this DC term at the output. Actually, the moving average path, which has unity DC gain, estimates the DC CFO phase rotation term $$\frac{L+1}{2}\theta$$

(while averaging out noise) at its output and subtracts it off the through pass, in effect cancelling out the DC term, $$\frac{L+1}{2}\theta.$$

The decision feedback (subtraction of the $\angle \check{S}_{k-1}$ decision phase fed from the slicer output out of the unit delayed, $Z^{-1}$ output $\angle \hat{S}_k^{+CFO}$ of the phase averaging stage–(here the +CFO superscript denotes that CFO is present in this signal to be cleaned up the CFO E&R module)) is intended to strip-off the data in the CFO estimation, as analyzed below.

There final "WRAP" operation at the CFO E&C module output prior to entering the moving average, is required in order to condition the input phase into the slicer to be mapped onto the $[-\pi, \pi)$ interval. The WRAP operation is formally defined in terms of the W{ } operator acting on an unwrapped phase sequence $\{u_k\}$ to yield a wrapped phase sequence:

$$\begin{aligned} w_k &= W\{u_k\} \\ &= \text{Arg}\{e^{ju_k}\} \\ &= u_k \bmod(-\pi, \pi] \\ &\equiv u_k - 2\pi r_k \\ &= u_k - 2\pi \left[\frac{u_k}{2\pi}\right]_{round} \end{aligned} \quad (27)$$

s.t. $w_k \in (-\pi, \pi]$ where Arg is the principal argument (angle) function mapping complex numbers to the $(-\pi, \pi]$ angular range; the modulo operation with respect to the $(-\pi, \pi]$ interval was defined in the last equality above, as subtraction (or addition) of an integer multiple of $2\pi$ bringing the result within the principal (wrapped phase) interval $(-\pi, \pi]$; the superscript round indicates rounding its argument to the nearest integer.

As the WRAP mapping is many-to-one, it appears that it is not invertible, however by imposing additional a-priori restrictions on the unwrapped phase sequence, $u_k$, one is able to nevertheless uniquely reconstruct $\{u_k\}$ out of $\{w_k\}$, as discussed further below. The algorithms implementing the unique inversion of the WRAP operation are referred to as UNWRAP and are known art, e.g. [14] briefly reviewed further below to the extent required for explaining our innovative advance. In fact one such particular novel algorithm was described in the context of the MSDD for phase-mitigation-only (FIGS. 1 and 9), under the name "phase disambiguation algorithm", which precedes the phase averaging operation within the module designated "Phase Disambiguation (Unwrap)+Averaging" in FIG. 9. Actually, other phase unwrap algorithms may be used, as detailed further below.

For now let us assume that the output of the "Phase Disambiguation (Unwrap)" sub-block consists of unwrapped phase versions (attaining any possible value) of the L phase inputs into the "Phase Disambiguation (Unwrap)+Averaging" block. Let us derive detailed mathematical analysis of operation of the polar MSDD, including the CFO E&C scheme of FIG. 10 modeling its noise and CFO performance We denote the output of the phase averaging and disambiguation block by $\angle \hat{S}^{+CFO}$ (the CEO superscript indicates that it is affected by CFO). Then by Eq. (26) (in the slightly different notation here):

$$L\hat{S}_k^{+CFO} = L S_k + \eta_k - \frac{1}{L}\sum_{i=1}^{L}\eta_{k-i} + \phi_{LPN} + \frac{L+1}{2}\theta \quad (28)$$

A unit delay and subtraction of the slicer decision feedback $\angle \check{S}_{k-1}$, yields $$\begin{aligned} L\hat{S}_{k-1}^{+CFO} - L\hat{S}_{k-1} &= L S_{k-1} + \eta_k - \frac{1}{L}\sum_{i=1}^{L}\eta_{k-1-i} + \frac{1}{L}\sum_{i=1}^{L}\phi_{k-i} + \\ &\quad \frac{L+1}{2}\theta - L\hat{S}_{k-1} \\ &= \eta_k - \frac{1}{L}\sum_{i=1}^{L}\eta_{k-1-i} + \frac{1}{L}\sum_{i=1}^{L}\phi_{k-1-i} + \frac{L+1}{2}\theta \end{aligned} \quad (29)$$

where in the last expression we assumed the slicer decision is not in error: $\angle S_{k-1} = \angle \check{S}_{k-1}$.

The last expression in Eq. (29) indicates that the input $\angle \hat{S}_{k-1}^{+CFO} - \angle \check{S}_{k-1}$ into the moving average is data-independent, consisting entirely of the constant CFO-induced phase rotation $$\frac{L+1}{2}\theta,$$

perturbed by phase noise terms. The moving average further reduces the variance of the phase noises in (29), extracting a relatively clean version of $$\frac{L+1}{2}\theta,$$

which is then subtracted off the $\angle \hat{S}_{k-1}^{+CFO}$ term arriving along the though path, cancelling out the $$\frac{L+1}{2}\theta$$

CFO phase rotation term present in $\angle \hat{S}_k^{+CFO}$. Notice that moving average path also leaks in some extra phase noise, however because of the averaging action this noise contribution is relatively small, just slightly enhancing the overall phase noise in the $\angle \hat{S}_k$ estimate, while cancelling out the $$\frac{L+1}{2}\theta$$

CFO phase rotation term. This completes the top-level analysis of the scheme of FIG. 10.

Alternative post-delta MSDD with discrete-gradient parallel CFO E&C

An alternative embodiment of an MSDD with CFO mitigation is introduced in FIG. 11, based on a modification of the polar MSDD of FIG. 1. This system is referred to as post-delta with parallel CFO E&C. Essentially, a CFO E&C module is added in parallel to the phase unwrap and averaging in FIG. 1 (however this CFO E&C module is somewhat different than the one shown in FIG. 10, which is connected in series rather than in parallel). This embodiment is a special case of a more general family of embodiments of post-delta type MSDD with parallel CFO mitigation to be described below, but is introduced first rather than showing first the general case, as it exemplifies the principle.

FIG. 11 illustrates a MSDD carrier recovery system with post-delta parallel CFO E&C compensating for both phase-noise and CFO.

The CFO E&C in FIG. 11 has two inputs, $\angle R_{k-1}^{(1)} = \angle r_{k-1}$, and $\angle R_{k-1}^{(L_\Delta)}$, where the considerations for selecting the index $L_\Delta$ will be explained in the sequel. These two inputs are subtracted out, yielding a so called discrete gradient (discrete-time derivative of the sequence of partial references $\angle R_{k-1}^{(i)}$, i=1, 2, 3, ... L) defined here as:

$$\Delta_i^{[1, L_\Delta+1]}\{\angle R_{k-1}^{(i)}\} \equiv \angle R_{k-1}^{(1)} - \angle R_{k-1}^{(L_\Delta+1)} = \angle r_{k-1} - \angle R_{k-1}^{(L_\Delta)} \qquad (30)$$

the output of which is subsequently averaged in an $L_a$ points moving average (MA) (the particular implementation of the MA is identical to the one within the CFO E&C in FIG. 10). The moving average output (which nominally includes the gain $1/L_a$ in order to provide unity gain at DC for the averaging operation) is further scaled by $1/L_\Delta$ (which might have been assigned to the definition of the discrete gradient, though we preferred to keep it separate), yielding an output denoted $\check{\phi}$ which is shown next to provide an estimate of the CFO phase increment per sample, θ.

Let us assess the difference Eq. (30) of partial references, accounting for why it may provide, after the moving average a good quality estimate, $\check{\phi}$, of the CFO phase estimate. Using Eq. (23) for $\angle R_{k-1}^{(1)}$ Eq. (30) simplifies to:

$$\Delta_k^{[1, L_\Delta]}\{\angle R_{k-1}^{(i)}\} \equiv \angle R_{k-1}^{(1)} - \angle R_{k-1}^{(L_\Delta+1)} \qquad (31)$$
$$= [\angle A_{k-1} + \eta_{k-1} + \phi_{k-1} - \theta + k\theta] -$$
$$[\angle A_{k-1} + \eta_{k-(L_\Delta+1)} + \phi_{k-(L_\Delta+1)} - L_\Delta \theta + k\theta]$$
$$= (\eta_{k-1} - \eta_{k-L_\Delta}) + (\phi_{k-1} - \phi_{k-L_\Delta}) + L_\Delta \theta$$

It follows that scaling by $1/L_\Delta$ (which is a multiplicative term in the overall gain following the moving average) and applying the moving average linear operation, denoted MA{ }, yields:

$$\check{\theta}[k] \equiv MA\left\{\frac{1}{L_\Delta} \Delta_i^{[1, L_\Delta+1]}\{\angle R_{k-1}^{(i)}\}\right\} = MA\{\theta\} + \varphi_k^{\hat{\theta}} = \theta = \varphi_k^{\hat{\theta}} \qquad (32)$$

where $\varphi_k^{\hat{\theta}} \equiv MA\left\{\frac{1}{L_\Delta}(\eta_{k-1} - \eta_{L_\Delta+1}) + \frac{1}{L_\Delta}(\phi_{k-1} - \phi_{L_\Delta+1})\right\}$ Thus, we have obtained an estimator $\check{\phi}$ for θ. The noise fluctuation $\phi_k \check{\phi}$ in it is initially suppressed in power by a factor of $$\frac{1}{L_\Delta^2}$$

relative to those of $\eta_{k-1} - \eta_{L_\Delta+1}$ and $\phi_{k-1} - \phi_{L_\Delta+1}$, and is further suppressed by passing through the moving average of length $L_a$. The component $1/L_a$ in the overall gain belongs to the moving average, and acts to suppress the phase noise, whereas the overall gain of the moving average with respect to the DC term, θ, is unity, thus the desired θ is not attenuated while the noise is.

Next, multiplication of $\check{\phi}$ by the constant ½(L+1) yields $$\hat{\psi}_{rot}^{CFO} \equiv \frac{L+1}{2}\check{\theta} = \frac{L+1}{2}\theta + \frac{L+1}{2}\varphi_k^{\hat{\theta}}, \qquad (33)$$

which is an estimator for the CFO phase rotation of Eq. (21), repeated here:

$$\psi_{rot}^{CFO} = \frac{L+1}{2}\theta = (L+1)\pi\Delta v_{CFO} R_s^{-1}.$$

This estimated phase rotation is subtracted off the $\angle r_k$ signal from the CORDIC module, thus a term $$\frac{L+1}{2}\theta$$

is added to $\angle r_k$ (Eq. (15)) yielding $$\angle r_k^{+CFO} \equiv \angle r_k - \left(\frac{L+1}{2}\theta + \varphi_k^{CFO\ E\&R}\right) = \qquad (34)$$
$$\angle A_k + \eta_k + \phi_k + k\theta - \frac{L+1}{2}\theta - \frac{L+1}{2}\varphi_k^{\hat{\theta}}.$$

where the term $$\frac{L+1}{2}\varphi_k^{\hat{\theta}}$$

is the phase noise leaking through the CFO E&R module.

Finally, the difference between this signal and the improved reference $\angle R_{k-1}^{+CFO}$ is generated and fed into the phase input of the polar domain slicer:

$$\angle \hat{S} = \angle r_k^{+CFO} - \angle R_{k-1}^{+CFO} \qquad (35)$$

Notice that a WRAP operation should also be included onto the input into the polar slicer (which by definition only accepts phase inputs in the $[\pi, \pi)$ range, but this WRAP operation is not explicitly shown, as it is assumed to be included within the slicer module In turn, $\angle R_{k-1}^{+CFO}$, coincides up to notation with Eq. (25):

$$\angle R_{\sim k-1}^{+CFO} = \angle A_{\sim k-1} + \frac{1}{L}\sum_{i=1}^{L}\eta_{k-i} + \frac{1}{L}\sum_{i=1}^{L}\phi_{k-i} - \frac{L+1}{2}\theta + k\theta \quad (36)$$

Evaluating Eq. (35) by subtracting Eqs. (34) and (36) yields:

$$\angle \hat{s}_k = \angle r_k^{+CFO} - \angle R_{k-1}^{+CFO} \quad (37)$$

$$= \angle A_k - \angle A_{k-1} + \eta_k - \frac{1}{L}\sum_{i=1}^{L}\eta_{k-i} + \phi_k - \frac{1}{L}\sum_{i=1}^{L}\phi_{k-i} - \frac{L+1}{2}\hat{\varphi}_k^\theta$$

$$= \angle s_k + \left(\eta_k - \frac{1}{L}\sum_{i=1}^{L}\eta_{k-i}\right) + \phi_k^{LPN} - \frac{L+1}{2}\hat{\varphi}_k^\theta$$

where the laser phase noise term $\phi_k^{LPN}$ is given by Eq. (20), and we note the beneficial cancellation of the $$-\frac{L+1}{2}\theta + k\theta$$

upon subtracting the two signals. It is apparent that the slicer input is essentially the transmitted data symbol phase, corrupted by white noise (with reduced variance due to the $$\frac{1}{L}\sum_{i=1}^{L}\eta_{k-i}$$

averaging, relative to a conventional delay detector, wherein the ASE induced white phase noise term would be $\eta_k - \eta_{k-1}$ rather than $$\eta_k - \frac{1}{L}\sum_{i=1}^{L}\eta_{k-i}$$

here. The ratios of powers of these two terms is obtained by observing that ASE noise samples at different discrete times may be assumed independent, hence add up on a power basis, yielding var$\{\eta_k - \eta_{k-1}\}2\sigma_\eta^2$ for the conventional delay detection case vs.

$$\text{var}\left\{\eta_k - \frac{1}{L}\sum_{i=1}^{L}\eta_{k-i}\right\} = \sigma_\eta^2 + \frac{1}{L^2}\sum_{i=1}^{L}\sigma_\eta^2 = \sigma_\eta^2\left(1 + \frac{1}{L}\right) \quad (38)$$

Thus, the ratio of the two variances is $$\left(1 + \frac{1}{L}\right)/2,$$

which is the factor by which ASE noise is suppressed by the MSDD.

At the same time one may derive an enhancement factor for the laser phase noise power relative to a simple delay detector, wherein the LPN term is $\phi_k - \phi_{k-1} = \phi_k$, with variance given by $\sigma_\Omega^2$. To this end one may evaluate the variance of $\phi_k^{LPN}$ as given by Eq. (20):

$$\text{var}\{\phi_k^{LPN}\} = \frac{1}{L^2}\text{var}\left\{\sum_{i=1}^{L}\sum_{m=k-i+1}^{k}\Omega_m\right\} \quad (39)$$

The derivation is deferred to further below, however simulations show that the degradation due to the enhanced LPN is less than the improvement due to averaging the white ASE noise, thus overall the MSDD acts to reduce the total noise. It is also important to assess the magnitude of the noise enhancement due to phase noise leaking through the CFO E&R, as represented by the $$\frac{L+1}{2}\hat{\varphi}_k^\theta$$

term. An evaluation of this term is also deferred at this point, however one may get a sense that this term ought to be small given the action of the moving average, which reduces the overall phase noise. Notice that the differentiation occurring in the discrete gradient of Eq. (30) effectively whitens the phase noise, extracting the independent increments of the Wiener phase noise process, allowing the averaging of the moving average to further reduce the resulting whitened noise. In fact the size of the averaging window may be selected sufficiently large such that significant suppression of the power of the $\phi_k^{CFO\,E\&R}$ is attained. A consideration why not to increase the moving average window indefinitely is related to the case when the CFO is not constant but linearly drifts (the presence of chirp). In this case the term related to the chirp is not cancelled by the CFO E&R but in order to keep this term small in magnitude the averaging window may not be taken indefinitely large.

Generalized MSDD Embodiments with Both Phase Noise and CFO Mitigation

Figure 12:
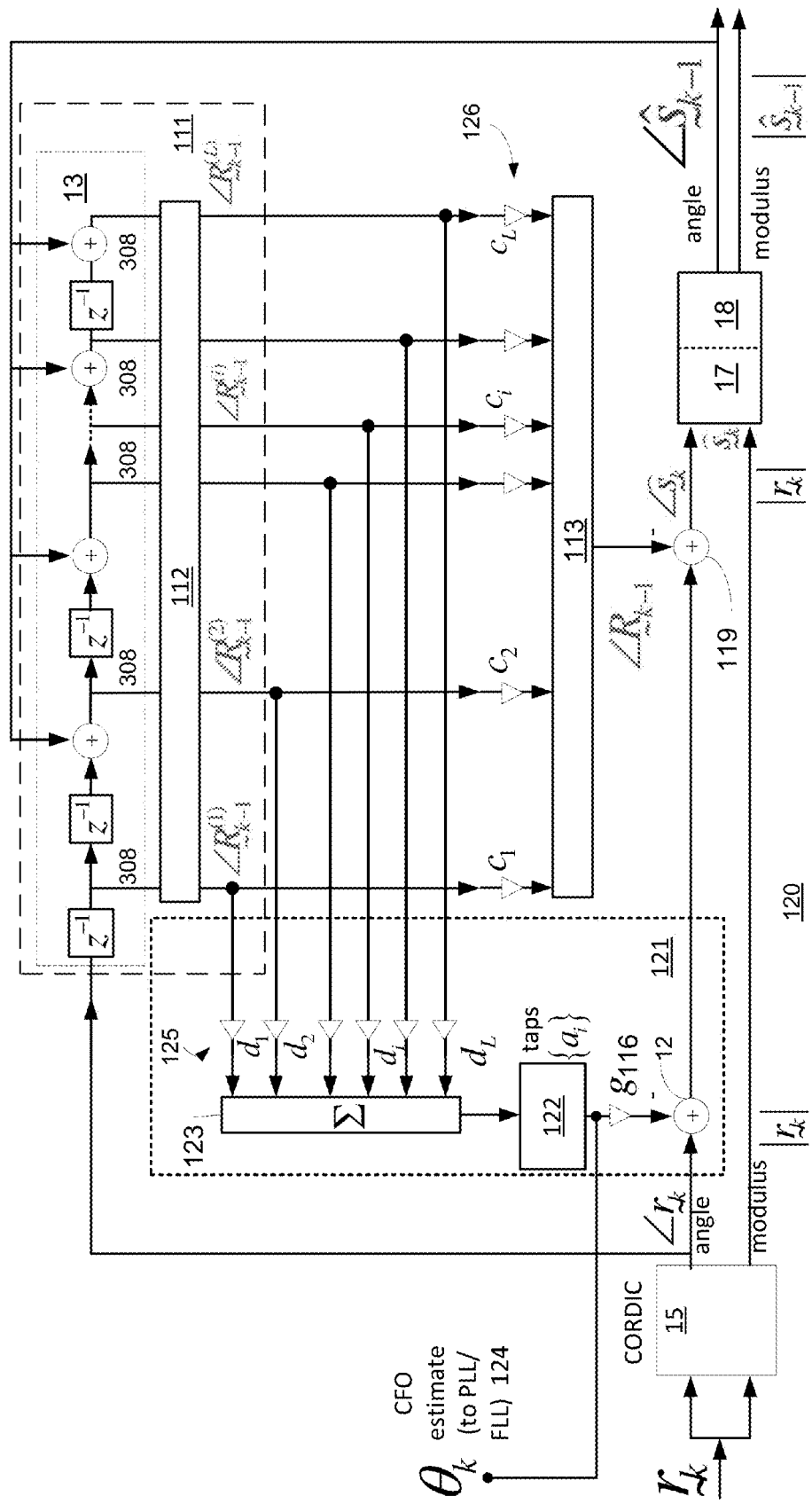
FIG. 12 illustrates an MSDD according to an embodiment of the invention.

A generalization for the post-delta parallel CFO E&C embodiment of FIG. 11 is introduced next. The $\Delta_i^{[1,L_\Delta+1]}\{\angle R_{k-1}^{(i)}\}$ discrete gradient in Eq. (30) is a particular instance of a linear time-invariant filter with zero DC gain More generally, let replace $$\frac{1}{L_\Delta - 1}\Delta_k^{[1,L_\Delta]}\{\angle R_{k-1}^{(i)}\}$$

of FIG. 11 with a general linear time invariant filter with zero DC gain, allowing in principle arbitrary taps, i.e., taking a linear combination of the partial references, $\{\angle R_{k-1}^{(i)}\}_{i=1}^{L}$, with arbitrary coefficients, as shown in FIG. 12. Notice that this linear combination is generated after the phase UNWRAP operation, i.e., it acts in the unwrapped phase domain.

The zero DC gain condition means that the taps should satisfy $\Sigma_{i=1}^{L} d_i = 0$. We refer to the resulting filter as generalized derivative, since the zero DC gain condition implies that the filter steady-state response to a constant is zero, hence the steady-state response to a ramp is a constant—as the discrete-time derivative behaves.

The output of the generalized derivative is fed into a moving average linear time invariant filter with taps $\{a_i\}$ (finite or infinite). Moreover, we also generalize the phase averaging operation (used for suppression of phase noise, unrelated to the CFO) from the particular special case of having L constant taps each equal to 1/L to using L taps with arbitrary values $\{c_i\}_{i=1}^{L}$, which should satisfy $\Sigma_{i=1}^{L} c_i = 1$, i.e., unity DC gain—which makes it behave like an average—the average of a constant sequence is the same constant sequence.

The coefficient g is selected such as to perfectly cancel the fixed CFO-induced phase rotation term, however this coefficient may be alternatively absorbed within the $\{d_i\}_{i=1}^{L}$ coefficients, as the linear constraint $\Sigma_{i=1}^{L} d_i = 0$ still be satisfied even when all coefficients are multiplied by a arbitrary factor g.

As a particularly useful example of the generalized post-delta parallel CFO E&C MSDD of Evidently, a filter with these taps qualifies as generalized derivative as it has zero DC gain (the taps sum up to zero).

Using Eq. (23), repeated here for convenience, $\angle R_{k-1}^{(i)} = \angle A_{k-1} + \eta_{k-i} \phi_{k-i} - i\theta + k\theta$ each pair of adjacent taps, $\{1,-1\}$ in the taps design of Eq. Error! Reference source not found, generates the following contribution to the FIR filter output:

$$\Delta_i^{[2n+1,2n]}\{\angle R_{k-1}^{(i)}\} \equiv \angle R_{k-1}^{(2n+1)} - \angle R_{k-1}^{(2n)}$$
$$= \left[\angle A_{k-1} + \eta_{k-(2n+1)} + \phi_{k-(2n+1)} - (2n+1)\theta + k\theta\right] -$$
$$\left[\angle A_{k-1} + \eta_{k-2n} + \phi_{k-2n} - 2n\theta + k\theta\right]$$
$$= (\eta_{k-(2n+1)} - \eta_{k-2n}) + (\phi_{k-(2n+1)} - \phi_{k-2n}) + \theta$$
$$= (\eta_{k-(2n+1)} - \eta_{k-2n}) + \Omega_{2n+1} + \theta$$

Summing over all pairs of adjacent taps, the contribution of the laser phase noise term is $\Sigma_{n=0}^{L/2} \Omega_{2n+1} = \Omega_1 \Omega_3 + \ldots + \Omega_{L-1}$ and the contribution of the CFO is $L/2\theta$. Scaling the filter by $\frac{2}{L}$ normalizes the CFO contribution to $\theta$, but then the laser noise is scaled down to $\frac{2}{L}(\Omega_1 + \Omega_3 + \ldots + \Omega_{L-1})$.

A similar analysis may be made for the ASE noise contribution. The noise contributions are the same as the ones generated by the system of FIG. 11, provided we set $L_A = L/2$. Thus, the generalized derivative structure just provides an alternative realization with the same noise performance, in this example.

FIG. 12 MSDD carrier recovery system of the generalized post-delta type with parallel CFO E&C compensating for phase-noise and CFO.

As for a generalization of the MSDD carrier recovery system of the post-delta type of FIG. 10, refer to FIG. 13. Here the generalization is more modest, simply replacing the phase average and moving average (which originally had uniform coefficients in FIG. 10) by corresponding averages with arbitrary taps subject to appropriate constraints on the DC gains.

The taps $\{c_i\}_{i=1}^{L}$ of the phase averaging filter satisfy unity DC gain, $\Sigma_{i=1}^{L} c_i = 1$. The taps of the moving average $\{a_i\}_{i=0}^{\infty}$ (possibly a finite sequence) satisfy $\Sigma_{i=1}^{L} a_i = 1$, such that both filters qualify as averages (the average of a constant sequence is the same constant sequence). FIG. 13 MSDD carrier recovery system of the generalized pre-delta with serial CFO E&C type compensating for phase-noise and CFO.

The taps, $\{d_i\}^L$, $\{c_i\}_{i=1}^{L}$, $\{a_i\}_{i=0}^{\infty}$ for the generalized MSDDs of FIGS. 12,13 should be preferably selected for maximal suppression of the overall phase noise in the slicer input $\angle \check{S}_k$, subject to the constraint that the CFO term be cancelled out.

Polar MSDD CFO E&C as Frequency Detector in Phase/Frequency Locked Loops

The robust CFO estimator provided within the $\Delta$-filter may be used as phase (or rather frequency) detector element in a digital Phase Locked Loop (PLL) or digital-analog Frequency Locked Loop (FLL) correcting the CFO upstream of the polar MSDD, typically ahead of the chromatic dispersion (CD) and polarization equalizers. This is achieved either by tuning the frequency of the local oscillator (LO) laser (in the FLL case) or by synthesizing a time-varying phase to be applied to a digital multiplier located ahead of the equalizers (in the PLL case). The CFO estimator in the MSDD provides an estimate of $\theta_k$, the instantaneous carrier frequency offset (which reduces to a constant $\theta$ for constant CFO). This auxiliary output of the CFO E&C is indicated in both FIGS. 12 and 13.

Now we briefly describe the PLL/FLL actuated by this auxiliary output.

The local oscillator (LO) laser essentially acts as a voltage tuned oscillator (VTO), driven by tuning frequency electrical control. As the frequency response of the laser tuning is substantially low-pass, to "close the loop" on the laser frequency it essentially suffices to low-pass filter the $\theta_k$ signal provided by the MSDD and apply the low bandwidth digital low-pass filter actuating output to a Digital to Analog Converter (DAC), the output of which drives the LO laser frequency tuning control. The low-pass filtering may be realized multiplier-free, with low-complexity by decimating the CFO estimator output $\theta_k$. An efficient hardware implementation successively passes the CFO estimator through a down-sampler by the factor $L_a$, followed by a sequence of decimators each of may consist of a moving average followed by a down-sampler (alternatively a more general FIR or IIR filter may be used ahead of the down-sampler instead of the moving average). There is need for substantial decimation within the FLL loop, since the sampling rate of the CFO E&C within the MSDD is very high (for optical systems, in the GS/s range) whereas the frequency response of the laser tuning is substantially low-pass, in the KHz range, thus about 6 orders of magnitude sampling rate reduction is required).

The resulting system also comprises an all-digital PLL which may be realized by passing the CFO estimator output $\theta_k$ through a digital loop filter which should contain at least one digital integrator (accumulator) to convert the frequency estimates (phase increments) $\theta_k$ into phase samples $\phi_k = \sum_{m=0}^{k} \theta_m$ used to demodulate the complex samples via multiplication by $\exp\{-j\phi_k\}$. In its simplest form the PLL loop filter driven by $\theta_k$ just consist of the accumulator. More generally additional loop filtering may be inserted to modify the loop dynamics (e.g., an additional integrator may allow the loop to follow slow but steady CFO ramps). To summarize this section, the CFO E&C module of the polar MSDD provides a fast and accurate sensor of the instantaneous frequency, which may be used in externally actuating frequency or phase control, closing the loop in FLL/PLL in the receiver system.

Figure 14:
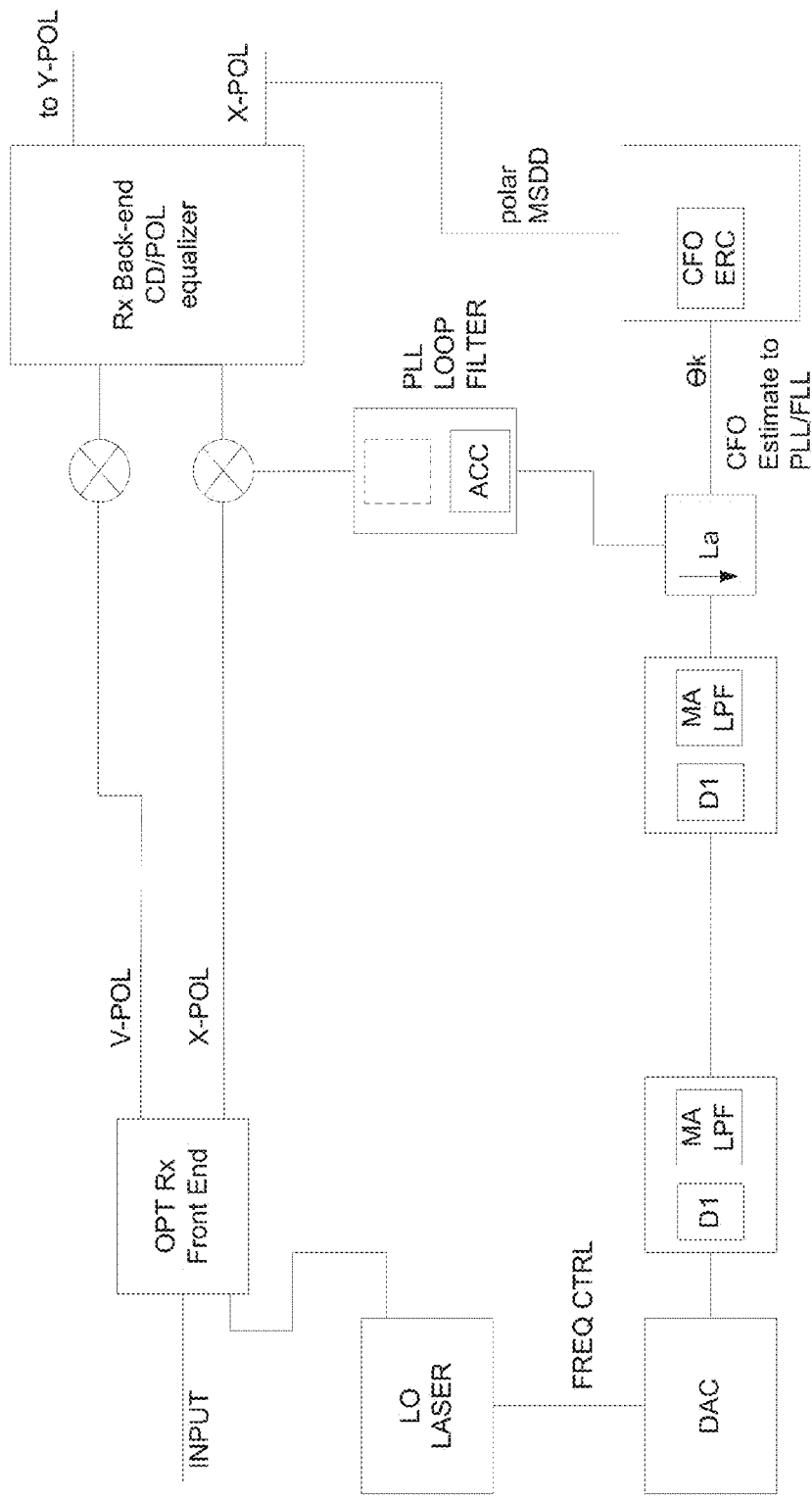
FIG. 14 illustrates a system 140 that includes a PLL/FLL for CFO mitigation using the MSDD CFO E&C as CFO sensor according to an embodiment of the invention.
Figure 15A:
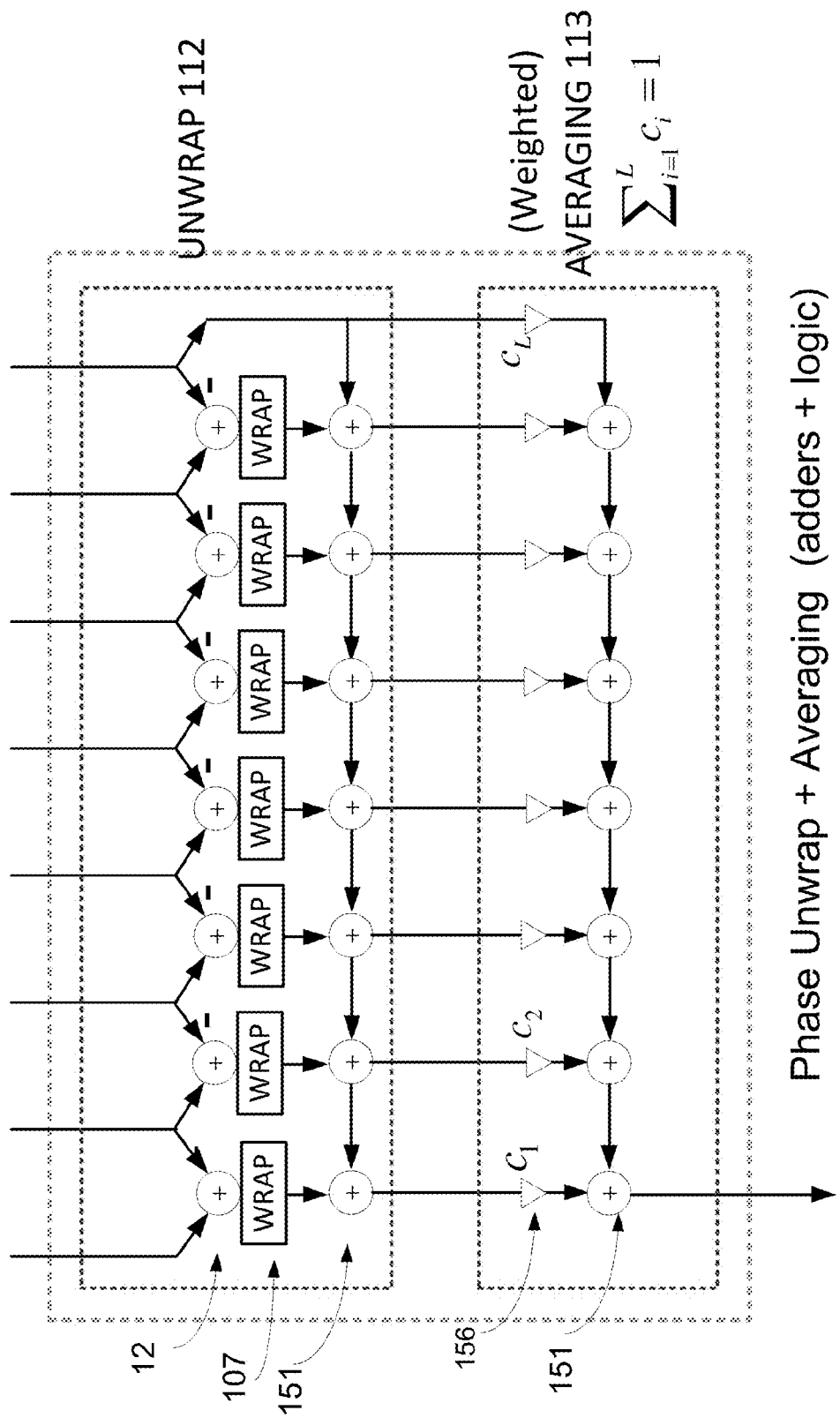
FIGS. 15A-15B illustrate phase unwrap and averaging circuits according to embodiments of the invention.
Figure 15B:
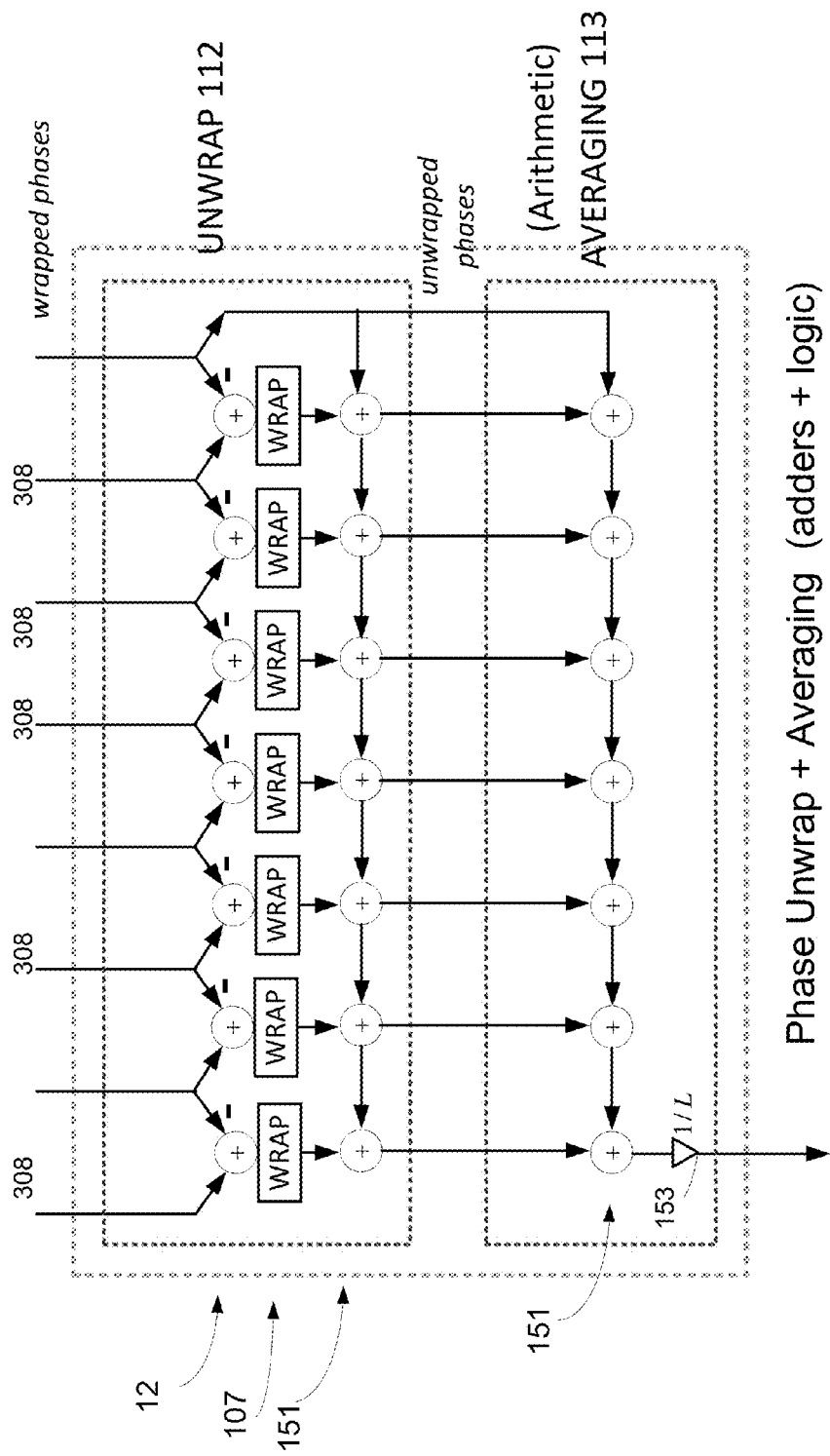

FIG. 14-PLL/FLL for CFO mitigation using the MSDD CFO E&C as CFO sensor <<note: two continuous lines should connect the X-pol and Y-pol outputs of the OPT Rx FRONT END with the two digital multipliers ahead of the Rx back-end CD/POL equalizer. Other details which may not be clear from the messy drawing: The input at the left is labeled "INPUT FIBER". There are three down-samplers (marked by down-arrows).

Design Tradeoffs for the MSDD System of FIG. 11

The three design parameters at our disposal in the MSDD system of FIG. 11 are L, $L_\Delta$, $L_a$, i.e., the MSDD window, the differencing step and the moving-average window. The parameter L is determined by the requirement to sufficiently suppress ASE without excessively enhancing LPN. The parameters $L_\Delta$, $L_a$ are both seen to reduce the noise enhancement once they are increased (as they reduce the feedforward gain, $$g = \frac{L+1}{2L_\Delta L_a}$$

of the $\Delta$-filter), however there are adverse tradeoffs limiting their increase as follows: $L_\Delta$ may not exceed L; let us then set it to L; Making $L_a$ too large, i.e., using too long an averaging window allows chirp (a CFO ramp) to accumulate as discussed in the next section. For agile burst receivers, a design "sweet-spot" consists of L=8, $L_\Delta$8, $L_a$=128. With these values, the resulting noise enhancement factor of Eq. Error! Reference source not found. is small. On the other hand, for a non-agile (non-burst) receiver, $L_a$ may be selected much larger, making the NEF much closer to unity.

Figure 16:
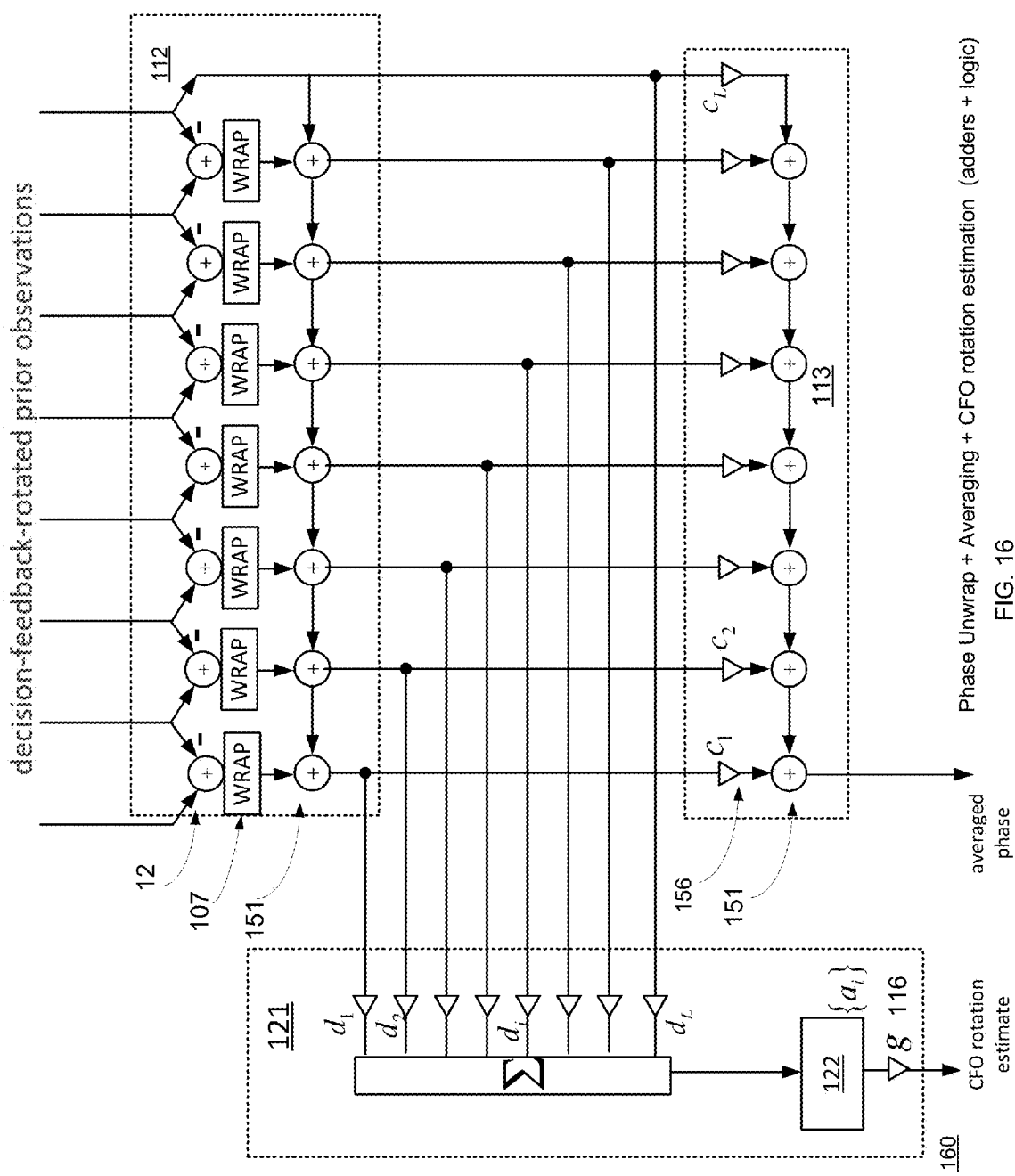
FIG. 16 illustrates a portion of an MSDD according to an embodiment of the invention.

Embodiments of Post-Delta MSDD with Parallel CFO E&C
Detailing the UNWRAP Module FIG. 16 illustrates the UNWRAP, PHASE AVG and CFO E&C sub-systems of a post-delta MSDD with parallel CFO E&C.

Figure 17:
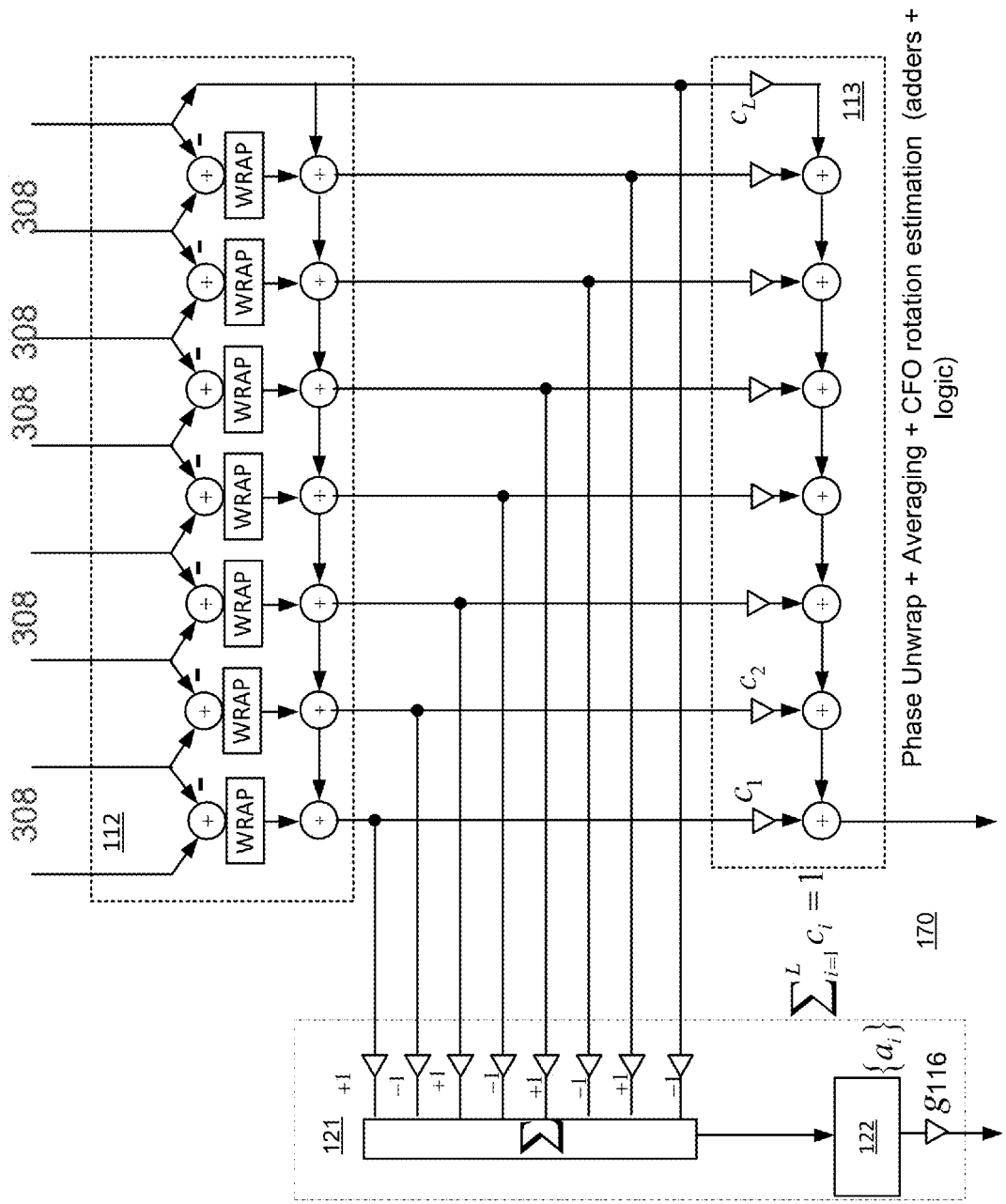
FIG. 17 illustrates a portion of an MSDD according to an embodiment of the invention.

FIG. 17 illustrates a special case of FIG. 16 with the taps of the CFO E&C filter given by +1, −1, +1, −1, . . .

Figure 18:
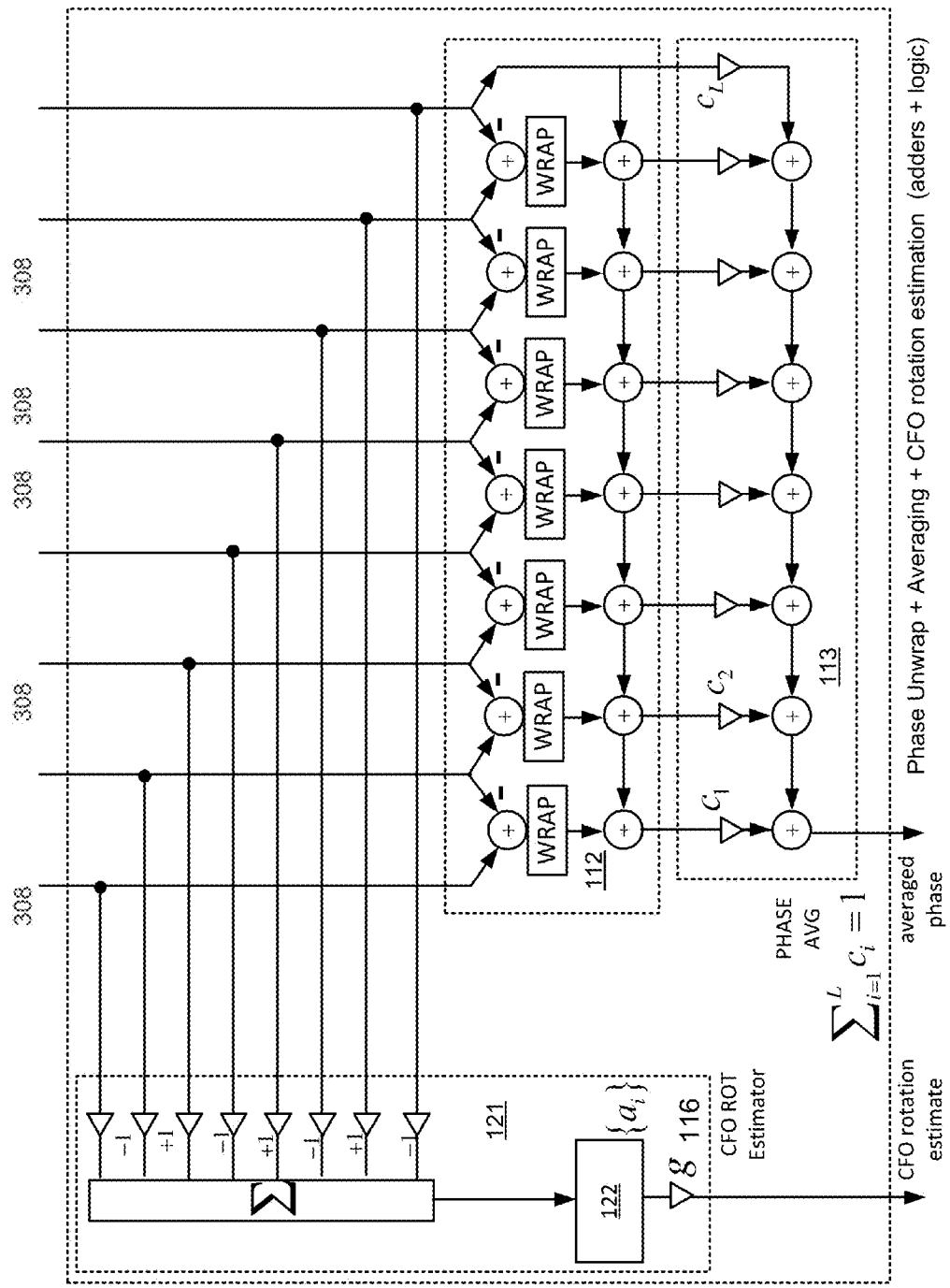
FIG. 18 illustrates a portion of an MSDD according to an embodiment of the invention.

In this particular case it will also work by applying the FIR with +1,−1,+1,−1, . . . taps in the unwrapped phase domain—this is because such an FIR may be viewed as summation of increments between each pair of adjacent inputs (partitioning the L inputs into L/2 disjoint pairs and taking the difference within each pair, then summing up. But this is equivalent to evaluating discrete gradients within each pair, in the unwrapped phase domain. However, by Itoh's theorem increments in the unwrapped domain equal increments in the wrapped domain, hence the FIR with +1,−1,+1,−1 may indeed be equivalently applied in the wrapped phase domain. FIG. 18 illustrates a system equivalent to that of FIG. 17 with the taps of the CFO E&C filter given by +1,−1,+1,−1, . . . but connected prior to the unwrap operation.

Figure 19:
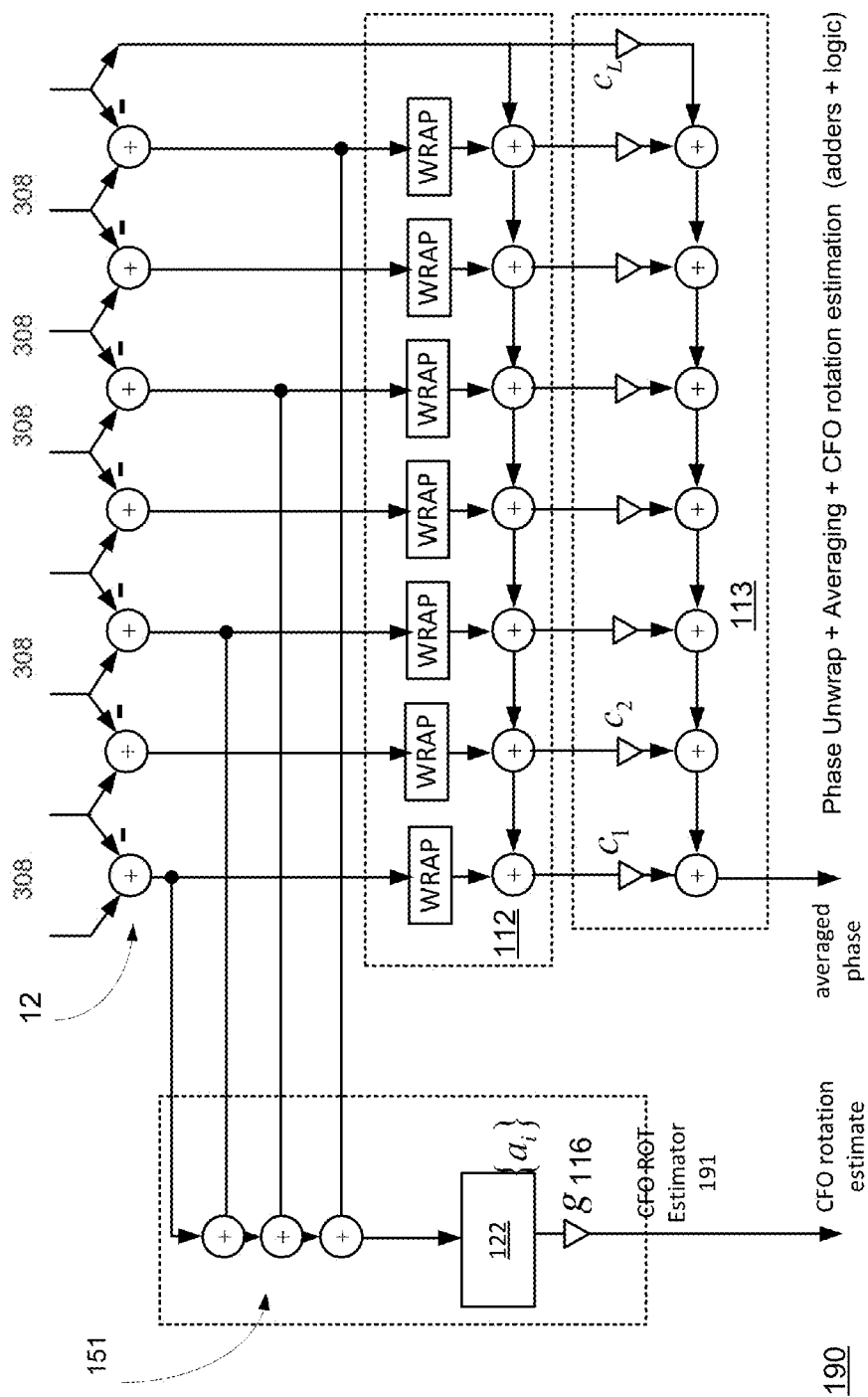
FIG. 19 illustrates a portion of an MSDD according to an embodiment of the invention.

FIG. 19 illustrates a system equivalent to that of FIG. 18, saving some adders. In the foregoing specification, the invention has been described with reference to specific examples of embodiments of the invention. It will, however, be evident that various modifications and changes may be made therein without departing from the broader spirit and scope of the invention as set forth in the appended claims Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality. Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense. In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We Claim:

1. A polar multi symbol differential detection (MSDD) module, comprising:
   an input unit that is arranged to:
   receive a current input symbol; and
   output a current phase signal and current amplitude signal that represent a phase and an amplitude of the current input symbol, respectively;
   a phase estimator that is arranged to:
   receive (a) the current phase signal and (b) an estimate of a phase of a last input symbol that preceded the current input symbol,
   generate multiple partial phase estimates, wherein a plurality of the multiple partial phase estimates of the multiple phase estimates are responsive to (i) phase signals representative of phases of a plurality of input symbols that preceded the current input symbol, and (ii) estimates of the phase of the plurality of input symbols; and
   output an reconstructed phase of the current input symbol, wherein the estimate of the reconstructed phase is response to, at least, the multiple partial phase estimates.

2. The polar MSDD module according to claim 1, wherein the phase estimator comprises multiple (L) partial phase estimation circuits; wherein for index q that ranges between a low limit and L, a l'th partial phase estimation circuit is arranged to calculate an l'th partial phase estimate that is a difference between the current phase signal and between a sum of phase signals of a last till l'th input symbols that preceded the current input symbols and estimates phases of the last till l'th input symbols that preceded the current input symbol.

3. The polar MSDD module according to claim 2, wherein the low limit equals one and wherein the wherein the phase estimator comprises a first partial phase estimation circuit that is arranged to calculate a first partial phase estimate that is a difference between the current phase signal and a last phase signal, the last phase signal represents the phase of the last input symbol that preceded the current input symbol.

4. The polar MSDD module according to claim 3 wherein the phase estimator comprises a slicer.

5. The polar MSDD module according to claim 1 wherein the phase estimator comprises a phase unwrapping circuit that is arranged to receive the multiple partial phase estimates and to provide multiple unwrapped partial phase estimates.

6. The polar MSDD module according to claim 5 wherein the phase estimator comprises an averaging circuit for averaging the multiple unwrapped partial phase estimates to provide an average phase estimate.

7. The polar MSDD module according to claim 5 wherein the phase estimator comprises a slicer that is arranged to receive an average phase estimate and to output the estimate of the reconstructed phase of the current input symbol.

8. The polar MSDD module according to claim 1 wherein the phase estimator comprises a carrier frequency offset (CFO) estimator.

9. The polar MSDD module according to claim 8 wherein the CFO estimator comprises a constant CFO phase rotation circuit that is arranged to calculate an estimate of a constant CFO phase rotation.

10. The polar MSDD module according to claim 9 wherein the CFO estimator further comprises an input port for receiving a CFO estimator input signal and a subtraction unit that is arranged to calculate a difference between the CFO estimator input signal and the estimate of the constant CFO phase rotation to provide a CFO estimator signal, wherein the reconstructed phase of the current input symbol is a function of the CFO estimator signal.

11. The polar MSDD module according to claim 9 wherein the CFO estimator further comprises a wrap unit arranged to receive a CFO estimator signal and provide a wrapped CFO estimator signal; wherein the polar MSDD module comprises a slicer that is arranged to receive the wrapped CFO estimator signal and output the estimate of the reconstructed phase of the current input symbol.

12. The polar MSDD module according to claim 8 wherein the CFO estimator 9 wherein a constant CFO phase rotation circuit is arranged to calculate an estimate of a constant CFO phase rotation by calculating a moving average of CFO estimator input signals.

13. The polar MSDD module according to claim 12 wherein, wherein each CFO estimator input signal is an average phase estimate calculated by averaging multiple unwrapped partial phase estimates.

14. A method for calculating a reconstructed phase, the method comprises:
receiving a current input symbol;
calculating a current phase signal and current amplitude signal that represent a phase and an amplitude of the current input symbol, respectively;
generating, in response to the current phase signal and an estimate of a phase of a last input symbol that preceded the current input symbol, multiple partial phase estimates, wherein a plurality of the multiple partial phase estimates of the multiple phase estimates are responsive to (i) phase signals representative of phases of a plurality of input symbols that preceded the current input symbol, and (ii) estimates of the phase of the plurality of input symbols; and
calculating a reconstructed phase of the current input symbol, in response to, at least, the multiple partial phase estimates.

15. A polar multi symbol differential detection (MSDD) module, comprising:
an input unit that is arranged to:
receive a current input symbol; and
output a current phase signal and current amplitude signal that represent a phase and an amplitude of the current input symbol, respectively;
a phase estimator comprises:
a first circuit that is arranged to:
receive (a) the current phase signal and (b) an estimate of a phase of a last input symbol that preceded the current input symbol, and
generate multiple partial references, wherein a plurality of partial references of the multiple partial references are responsive to (i) phase signals representative of phases of a plurality of input symbols that preceded the current input symbol, and (ii) estimates of the phase of the plurality of input symbols;
a phase unwrap circuit that is arranged to receive the multiple partial references and calculate unwrapped partial references;
a carrier frequency offset (CFO) module that is arranged to estimate a constant CFO phase rotation in response to the unwrapped partial references; and
an output circuit that is arranged to output an reconstructed phase of the current input symbol, wherein the estimate of the reconstructed phase is response to, at least, the estimate of the constant CFO phase rotation and to the unwrapped partial references.

16. The polar MSDD module according to claim 15 wherein the CFO estimator comprises a moving average circuit for calculating the estimate of the constant CFO phase rotation in response to a difference between at least two of the unwrapped partial references.

17. The polar MSDD module according to claim 16 wherein the CFO estimator comprises the moving average circuit that is arranged to receive only a part of the unwrapped partial references and to calculate the estimate of the constant CFO phase rotation.

18. The polar MSDD module according to claim 16 further comprising a first weighted sum module that is arranged to calculate a first weighted sum of the unwrapped partial references.

19. The polar MSDD module according to claim 16 wherein the CFO estimator comprises a moving average circuit that is arranged to calculate a first partial weighted sum of a first part of the unwrapped partial references, to calculate a second partial weighted sum of a second part of the unwrapped partial references, and calculate a difference between the first and second partial weighted sums, and to provide the difference to a moving average circuit.

20. The polar MSDD module according to claim 18 wherein the output circuit is arranged to subtract the first weighted sum of the unwrapped partial references from the estimate of the constant CFO phase rotation.

* * * * *